United States Patent
Olsen et al.

(10) Patent No.: US 11,580,305 B2
(45) Date of Patent: Feb. 14, 2023

(54) AUTOMATICALLY ASSISTING CONVERSATIONS USING GRAPH DATABASE

(71) Applicant: Microsoft Technology Licensing, LLC, Redmond, WA (US)

(72) Inventors: Bernt Ivar Olsen, Tromso (NO); Kristian Elsebø, Tromso (NO); Jon Meling, Tromso (NO)

(73) Assignee: Microsoft Technology Licensing, LLC, Redmond, WA (US)

(*) Notice: Subject to any disclaimer, the term of this patent is extended or adjusted under 35 U.S.C. 154(b) by 541 days.

(21) Appl. No.: 15/636,066

(22) Filed: Jun. 28, 2017

(65) Prior Publication Data
US 2019/0005023 A1 Jan. 3, 2019

(51) Int. Cl.
| | |
|---|---|
| G06F 40/30 | (2020.01) |
| G06F 16/93 | (2019.01) |
| G06F 16/901 | (2019.01) |
| G06F 40/35 | (2020.01) |
| G06F 40/134 | (2020.01) |
| G06F 40/169 | (2020.01) |

(Continued)

(52) U.S. Cl.
CPC .......... *G06F 40/30* (2020.01); *G06F 16/9024* (2019.01); *G06F 16/93* (2019.01); *G06F 17/00* (2013.01); *G06F 40/134* (2020.01); *G06F 40/169* (2020.01); *G06F 40/295* (2020.01); *G06F 40/35* (2020.01); *H04L 51/04* (2013.01); *H04L 51/08* (2013.01)

(58) Field of Classification Search
CPC .......... H04L 51/04; H04L 51/08; G06F 17/00
See application file for complete search history.

(56) References Cited

U.S. PATENT DOCUMENTS

| | | | |
|---|---|---|---|
| 6,816,858 B1 | 11/2004 | Coden et al. | |
| 7,665,107 B2 * | 2/2010 | Goodman | G06Q 30/02 725/32 |

(Continued)

FOREIGN PATENT DOCUMENTS

| | | |
|---|---|---|
| CN | 104836720 A | 8/2015 |
| JP | 2009163358 A | 7/2009 |

OTHER PUBLICATIONS

Shin, et al., "Extracting Keywords from Multi-party Live Chats", In Proceedings of 26th Pacific Asia Conference on Language, Information, and Computation, Nov. 8, 2012, pp. 199-208.

(Continued)

*Primary Examiner* — Samuel G Neway

(57) ABSTRACT

Examples of the present disclosure describe systems and methods for automatically assisting conversations using a graph database. In order to minimize misunderstanding of words and phrases used by participants during a conversation, phrases from the conversation may be received by conversation assistance application as the conversation takes place. Entities may be extracted from the phrase based on natural language recognition according to a domain context of the participant being assisted. One or more tags may be looked up from a graph database, and may be provided to the participant as a list of hashtags related to the conversation. Links to documents may be extracted based on the tags for the participant for viewing during the conversation.

20 Claims, 12 Drawing Sheets

(51) Int. Cl.
*G06F 40/295* (2020.01)
*G06F 17/00* (2019.01)
*H04L 51/08* (2022.01)
*H04L 51/04* (2022.01)

(56) References Cited

U.S. PATENT DOCUMENTS

| | | | | |
|---|---|---|---|---|
| 8,046,259 | B1* | 10/2011 | Siegel | G06Q 10/10 |
| | | | | 705/14.73 |
| 8,533,223 | B2 | 9/2013 | Houghton | |
| 8,914,452 | B2 | 12/2014 | Boston et al. | |
| 9,374,327 | B2 | 6/2016 | Rao Dv | |
| 9,444,648 | B1* | 9/2016 | King | G06Q 10/107 |
| 2005/0289220 | A1* | 12/2005 | Chen | H04L 12/1827 |
| | | | | 709/206 |
| 2007/0118592 | A1* | 5/2007 | Bachenberg | G06Q 30/02 |
| | | | | 709/203 |
| 2008/0115068 | A1* | 5/2008 | Smith | H04L 12/1813 |
| | | | | 715/758 |
| 2011/0231395 | A1* | 9/2011 | Vadlamani | G06F 16/3329 |
| | | | | 707/723 |
| 2012/0065969 | A1* | 3/2012 | DeLuca | G10L 15/26 |
| | | | | 704/235 |
| 2013/0054613 | A1* | 2/2013 | Bishop | G06F 17/2705 |
| | | | | 707/748 |
| 2014/0074950 | A1* | 3/2014 | Fan | H04L 51/20 |
| | | | | 709/206 |
| 2014/0195621 | A1* | 7/2014 | Rao Dv | H04L 12/1827 |
| | | | | 709/206 |
| 2015/0286747 | A1 | 10/2015 | Anastasakos et al. | |
| 2016/0173428 | A1* | 6/2016 | Balasubramanian | G06F 16/335 |
| | | | | 709/206 |
| 2017/0295119 | A1* | 10/2017 | Rosenberg | H04L 51/046 |
| 2018/0062951 | A1* | 3/2018 | Greenberger | H04L 51/04 |
| 2018/0191651 | A1* | 7/2018 | Goldberg | H04L 51/32 |
| 2018/0367490 | A1* | 12/2018 | Goto | H04L 51/22 |
| 2019/0005023 | A1* | 1/2019 | Olsen | G06F 17/2785 |

OTHER PUBLICATIONS

Tur, et al., "The CALO Meeting Assistant System", In Proceedings of IEEE Transactions on Audio, Speech, and Language Processing, vol. 18, Issue 6, Aug. 2010, pp. 1601-1611.

* cited by examiner

AUTOMATICALLY ASSISTING CONVERSATIONS USING GRAPH DATABASE

BACKGROUND

Tools for electronic communication such as voice video calls, chat and emails have become common. Participants with backgrounds from different domains may casually exchange ideas through conversations using media such as but not limited to texts, voice, sound, and documents in a frequent manner. For instance, a voice phone call, a video call, and a tool for electronic chat may provide means for exchange messages in conversations in real-time, synchronously among participants. In another example, a tool for emails may provide means for having conversations in asynchronous manner.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues may be resolved by automatically assisting conversations using graph database. Conversations may be assisted by receiving phrases being exchanged during a conversation, extracting entities through natural language processing based on a domain context of the assisted participant, retrieving tags that match with the extracted entities by look-up operations on a graph database. Tags may be provided to applications used by the assisted participants for inform tags and/or hashtags as relevant to the conversation. When one of tags may be received, a list of links to documents that may be pertinent to the tag may be retrieved from the graph database while confirming access permission of the requesting participant to the respective documents. The retrieved links may be provided to the application(s) associated with the participants.

In aspects, at least one phrase from a conversation may be received. One or more tags may then be extracted from the at least one received phrase, providing the at least one tag, receiving a tag, based on the received tag, retrieving links to documents from at least one graph database, and providing the links to documents.

The method of the system may further comprise receiving identity of a participant of the conversation, wherein extracting at least one tag comprises extracting at least one entity from the received phrase based on natural language recognition, and based on the extracted at least one entity, retrieving at least one tag from at least one graph database.

The method of the system may further comprise receiving identity of a participant of the conversation, wherein retrieving links to documents comprise retrieving tag nodes from the at least one graph database, based on the retrieved tag nodes, retrieving at least one link to documents associated with the retrieved tag nodes, and ranking the retrieved at least one link to documents based on relevance to the extracted at least one entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
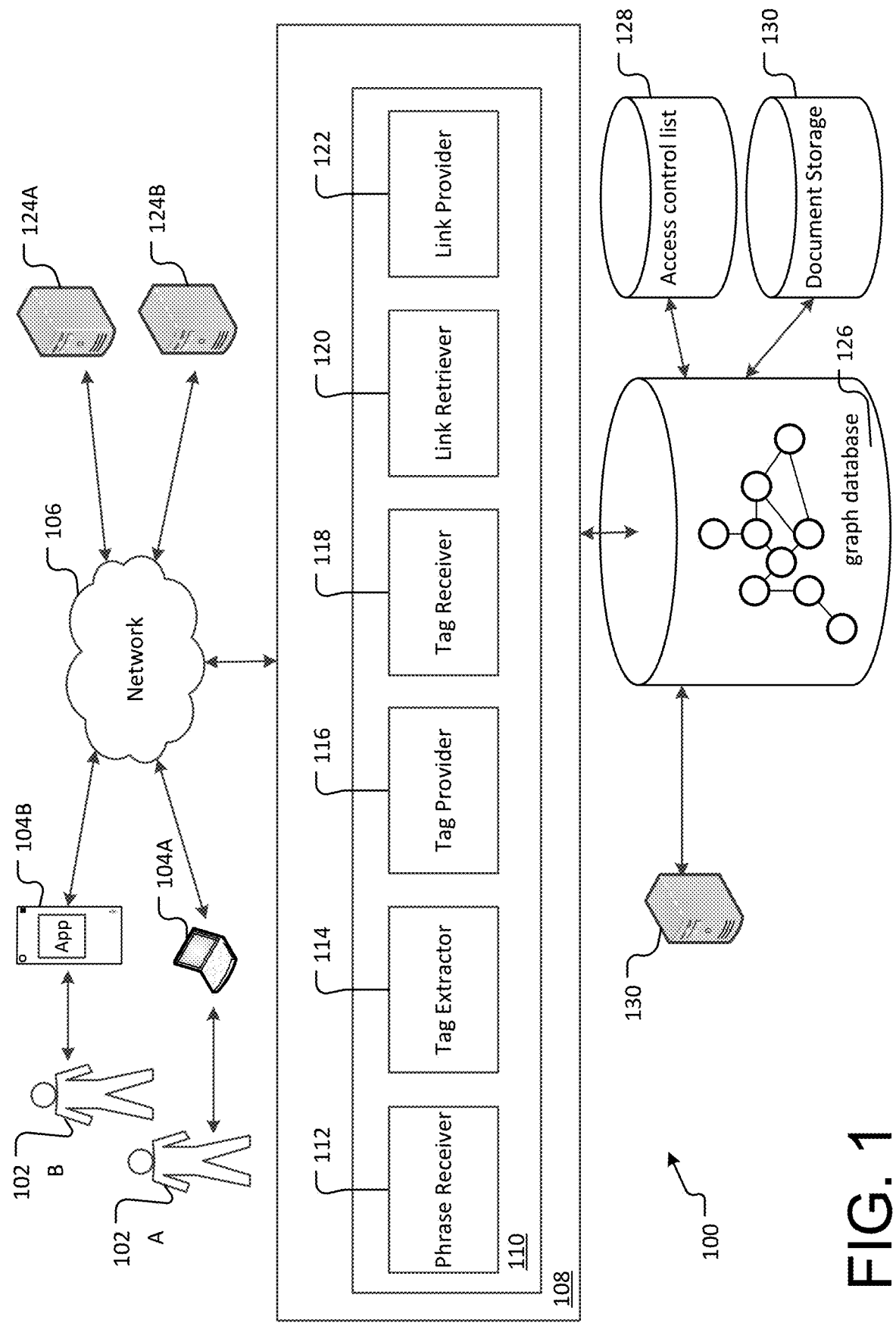
FIG. 1 illustrates an overview of an example system for assisting conversations using a graph database.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides system and methods for automatically assisting conversations using graph database. In aspects, electronic communications (e.g., email, instant messaging, text messages, etc.) may be augmented by identifying and providing information associated with the conversation to conversation participants. For example, a conversation between participants from different domains (e.g., different companies, departments, geographic locations, etc.) may result in misinterpretations a word or a phrase has different meanings in different domains or relates to information that a participant in a conversation may not know. As a result, misunderstanding may occur between the conversation participants. Aspects disclosed herein further leverage access control information to make sure that participants in a conversation are not provided access to information they are not allowed to view.

Additionally or alternatively, types of database may not only be graph database but may comprise other types of databases. Types of database may comprise but not limited to relational databases such as SQL-based databases, non-relational databases such as but not limited to NoSQL-based databases, key-value stores, column stores and document stores and real-time databases. In some aspects combinations of different types of database to process data with appropriate levels of various system parameters such as but not limited to availability, consistency, scalability, costs and performances to automatically assisting conversations. Databases according to the disclosure may be local, on-board memory, hierarchically placed among one or more types of storage media such as memory and hard disks, clients, as well as distributed databases across one or more networks as appropriate to assist conversations.

As an example, a conversation may take place via a voice and/or video phone calls. Participants may interact with each other by exchanging and receiving words and phrases via audio and/or video streaming using an electronic device, such as a smartphone, a computing device, video conference equipment, etc. Use of words or phrases that have a particular meaning in one domain such as, in engineering, may have a different meaning in another domain, such as finance. A topic may be more relevant to a participant than other participants because of group memberships of respective participants, a frequency of using words related to the topic as well as a frequency of accessing information related to the topic. For instance, the term "quality" may be associated with a number of bugs or issues in engineering or development domain, whereas quality may be associated with accuracy of numbers in finance. For participants from the finance group, the term "accuracy in numbers" may be more closely related to "quality" than "bugs in program codes." Similarly, acronyms may not necessarily be understood accurately by participants if, for example, the participants work in different groups and organizations. Use of such words and phrases without becoming aware of other participants from different domains may lead to misunderstanding and frustrations by participants of the conversation. Assisting the conversation by providing explanations and additional information about these words with different meanings may be helpful. Retrieving and providing information about terms and acronyms during a conversation may be with low latency to assist the participants without delay as the conversation takes place.

In another example, a conversation may take place using electronic tools such as a chat application and/or email. The pace of transmitting words and phrases may be less intensive than voice calls, but the conversations may evolve among different topics quickly. Moreover, multiple threads of conversations may take place simultaneously on chat and emails. As is the case with having conversations on voice and/or video calls, unintended misuse of acronyms and phrases may invite issues during the conversations. Furthermore, unlike voice and/or video calls, words and phrases transmitted between participants during the conversations may be stored and reused for other conversations, thereby causing more confusions among participants when the conversations are reviewed at later time. Aspects of the present disclosure may provide relevant information to participants as the conversations occurs or when the conversation is later reviewed.

Natural language processing and graph databases may be combined in a way to provide highly efficient systems and methods for automatically assisting conversations determining relevant information for the participants in a conversation. In one example, the relevant information identified and provided may be individualized for a specific participant in a conversation. Alternatively, the same relevant information may be provided to multiple participants in a conversation. Natural language processing may be employed to extract and identify entities that are pertinent to specific domains of respective participants from words and phrases used during a conversation. As an example, a conversation may occur between two participants, where a first participant is a member of a finance group of a company, while a second participant is a member of a development group of the same company. When the first participant uses language referencing an entity, such as a name of a project within the company, the second participant may be unfamiliar with the project name. The first participant may, continue conversation without realizing that the second participant is unfamiliar with the project. Natural language processing along with graph database may be employed to provide the correct information or context to the second participant in an efficient manner. For example, natural language words or phrases used during the conversation may be processed, and entities according to a domain that is related to the first participant (e.g. the finance group) may be extracted from a message from the first participant.

Referring to the example conversation between the finance and engineering employees, the name of project may be identified as an extracted entity from the conversation. Tags that are related to the extracted entity may be looked up from the graph. From the tags, information that are related to the tags may be identified. For instance, information about the project may be determined using a graph database and provided to the respective participants from finance and engineering. Respective participants may receive relevant information and/or context that is specifically tailored to respective to participants based on access rights and relevance of topics that are differently set to respective participants from different domains and groups, while the participants continue the conversation. Additionally or alternatively, tags that are related to the originally identified tag from the extracted entities may be provided to respective participants. Contents of the sets of tags may differ among the participants, which may result in providing more information related to respective tags based on degrees of relevance of tags to respective participants and access rights to information by respective participants. In this way, different sets of tags and associated information may be provided to different participants depending on how tags are associated differently among other tags for respective participants and how access rights to information are set among the participants. An efficient and scalable graph database with embedded access control rights may enable such real-time lookup operations of identify tags and related information while the conversation takes place.

In aspects, using a domain of the second participant to extract entities may be effective to automatically assist the second participant. For instance, there may be a case where the second participant may be interested in topics that are specific to the second participant based on words and phrases being used during the conversation with the first participant. Use of the domain for the second participant (e.g. development) may enable extracting entities that are both specific and familiar with the second participant, regardless of whether the entities are extracted from words and phrases mentioned by the first participant or the second participant.

In some other aspects, the different domain associated with conversation participants may be augmented to extract entities of natural language words and phrases of conversations between the participants, providing tags and information to convey differences among the different domain. The augmentation may be subject to access permission being enforced on tags and information among the participants. Differences in meanings of the same words or phrases may be provided to respective participants by displaying different definitions of the same words or phrases in respective domains to help the participants resolve potential misinterpretations and misunderstanding. Additionally or alternatively, different types of information and resources such as but not limited to electronic files, documents, spreadsheets, websites, snippets of information, as well as links to these resources (collectively referred to as documents in the present disclosure) may be provided based on selections of tags.

In aspects, a tag may be a topic, a keyword, or other at least one word that may be related to a document. A tag may be created based on one or more words that appear in a document. Additionally or alternatively, a new tag may be manually added through user interactions such as graphical user interfaces by associating the new tag with at least one document. A tag may be associated with at least one document. In a graph, a tag may be a node, having a link to at least one document. A tag may be linked with other tags that are related semantically. In aspects, a link is a link to a document. A link may comprise a part that manages access rights by at least one participant of the conversation to the document. Both tags and links may be incorporated in a graph.

Accordingly, there is a need for automatically assisting conversations by for disambiguating terms, providing relevant information, and or providing related resources to individual participants using graph databases. In some aspects, words and phrases from a conversation may be received, and natural language processing may be used to extract one or more entities in some domains as one or more topics of the conversation. The extracted one or more entities may be provided to the participant of the conversation as topics of the conversation. For example, the topics may be highlighted as keywords during the conversation. Additionally or alternatively, the topics may be listed as hashtags during the conversation. The participants may select one or more topics or hashtags. In some aspects, a topic used in a conversation may be received from a participant of a conversation, and the topic may be looked up in a graph database to identify any link to a document which the participant has access to. It is with respect to these and other general considerations that embodiments have been made.

In some aspects, there may be one conversation taking placing between two participants from two different domains, respective participants may be automatically assisted during the conversation by receiving tags or topics associated with the conversation, as well as one or more links to resources (e.g., documents, spreadsheets, websites, etc.) related to tags identified in the conversation. In aspects, individual participant may be provided completely different sets of documents as related to respective topics. For example, a participant A, who is an accounting specialist of a corporation X may have a conversation with a participant B, who is a software engineer at the corporation Y, using a messaging application. An individual participant may be assisted by a different execution instance of conversation assistance application independently, using a the same set of natural language understanding processes along with graph databases, or a different set of natural language understanding processes with at least one domain context that may be specific to one of the two participants, and an independent deployment of graph databases with tags and links to different set of documents. Participant A may be provided with tags and links, which may be different from tags and links provided to participant B, while communication takes place between the two participants as a conversation.

FIG. 1 illustrates an overview of an example system for automatically assisting conversation using a graph database. System 100 may include one or more client computing devices 104 (e.g., client computing devices 104A and 104B) that may execute a client version of a conversation assistance application capable of automatically assisting conversations. In some examples, the client conversation assistance application may execute locally on a client computing device 104. In other examples, a client conversation assistance application (e.g., a mobile app on a thin client computing device 104) may operate in communication (e.g., via network 106) with a corresponding server version of conversation assistance application 110 executing on one or more server computing devices, e.g., server computing device 108. In still other aspects, rather than executing a client version of a conversation assistance application, the one or more client computing devices 104 may remotely access, e.g., via a browser over network 106, the conversation assistance application 110 implemented on the server computing device 108 or multiple server computing devices (e.g., in a distributed computing environment such as a cloud computing environment).

As illustrated by FIG. 1, a conversation assistance application 110 may be implemented by server computing device 108. As should be appreciated, the server version of conversation assistance application 110 may also be implemented in a distributed environment (e.g., cloud computing environment) across a plurality of server computing devices (not shown). Moreover, as should be appreciated, either a client or a server version of the conversation assistance application 110 may be capable of automatically assisting conversations. While a server version of the conversation assistance application 110 and associated components 112-122 are shown and described, this should not be understood as limiting. Rather, a client version of conversation assistance application 110 may similarly implement components 112-122 on a client computing device 104. The conversation assistance application 110 may assist each participant of the conversion independently by providing tags or topics of interests that may be personalized for the participant.

In a basic configuration, the one or more client computing devices 104 (e.g. 104A and 104B) may be personal or handheld computers having both input elements and output elements operated by one or more users 102 (e.g., user 102A and user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., XBOX®); a television; or the like. One of skill in the art will appreciate that any suitable client computing device for executing a client conversation assistance application and/or remotely accessing conversation assistance application 110 may be utilized with the aspects disclosed herein.

In some aspects, network 106 is a computer network such as an enterprise intranet, an enterprise extranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As described above, the conversation assistance application 110 may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud computing environment). Server computing device 108 may provide tags and contents of received phrases for conversations, contents, electronic files and documents (and associated attributes and properties of contents, electronic files and documents) stored in a graph database 126 to and from the one or more client computing devices 104 and/or one or more other server computing devices (e.g., server computing devices 124A and/or 124B) via network 106.

The conversation assistance application 110 may include various processors for automatically assisting conversations using a graph database, such as, but not limited to, phrase receiver 112, tag extractor 114, tag provider 116, tag receiver 118, link retriever 120, link provider 122 and the like. In aspects, each processor may communicate and pass data between the other processors. The various processors may be implemented using hardware, software, or a combination of hardware and software. Moreover, the various processors may be executed on a single server computing device (e.g., server computing device 108), on multiple server computing devices (e.g., server computing devices 124A, 124B and/or 130), or locally on a client computing device (e.g., client computing device 102A or 102B).

In aspects, phrase receiver 112 may receive at least one phrase from at least one of the participants of a conversation whom the conversation assistance application 110 may assist. For example, phase receiver 112 may receive words and phrases as a conversation proceeds. Phrase receiver 112 may receive words and phrases as used by any of participants of the conversation. A phrase may include, but not limited to, texts and words as extracted from images, video, audio, combinations of thereof. A conversation may include, but are not limited to a person-to-person conversation, a person-to-bot conversation, and the like. A conversation may include one or more participants of the conversation receiving live data feed such as price and other status monitoring ticker texts, text data that has been extracted from photos and video streaming.

In aspects, words and phrases may be received over a network. The words and phrases may be provided through connections with types such as wired and/or wireless networks that are addressable by IP-based or non-IP based addresses. In some examples, the phrase receiver 112 may an identity of one of the participants.

Tag extractor 114 may extract one or more tags, such as, but not limited to, keywords and topics, based on the phrase received by phrase receiver 112 and the graph database. In some aspects, a received phrase may be expressed in natural language. Phrase receiver 112 may extract entities from the received phrase based on context of the conversation. In some aspects, the natural language processing may be specific to a certain subject area such as medical and engineering. The received queries in natural language may be parsed based on context of the domain of the participant such as medical and engineering if the participant is familiar with the domain context.

In aspects, tag extractor 114 may retrieve one or more tags such as, but not limited to, keywords and topics from graph database by looking up the graph database. For instance, tag extractor 114 may look up the graph database to retrieve at least one tag node that matches with a tag that has been extracted from the received phrases. Tag extractor 114 may look up and receive one or more tags that exist as nodes in the graph database.

In some aspects, tag extractor 114 extracts a tag for the conversation participant when there is at least one document that is accessible to a participant in the conversation. In examples, access to a document may be determined using an access control list for the document. For example, tag extractor 114 may extract a tag "XYZ" from a phrase received for a conversation. Tag extractor 114 may retrieve the tag "XYZ" from a graph database. However, tag extractor 114 may prevent providing or displaying the tag "XYZ" to a participant when the access control list of documents related to the tag "XYZ" does not grant the participant an access to the document in the graph database. In effect, tag extractor 114 retrieves from the graph database tags with at least one link to a document that is accessible by the participants. In some aspects, a participant may access a document if they are granted ownership, read rights, and/or write rights to the document. In some aspects, access control may be associated with documents. In some other aspects, access control may be associated with tags. In some examples, tags without access permission granted to a participant may be prevented from being selected for the participant.

Tag provider 116 may provide one or more extracted tags to a participant associated with the phrase (e.g., a participant to provide the phrase or received the phrase). One or more tags may be extracted by tag extractor 114. Tag provider 116 may provide a list of the extracted tags to one or more participants of the conversation. In aspects, tags may be provided over a network. The tags may be provided through various different connection types such as wired and/or wireless networks that are addressable by IP-based or non-IP based addresses. For example, a chat messaging application that the participant uses on a client computing device may receive the tags provided by the tag provider 116. The chat messaging application may display the tag as a list of hashtags for the conversation participant. Alternatively, the chat messaging application may highlight the tags in the phrases of the conversation, for example through the use of bold, italic, or underlined fonts, colors, graphics, etc. The chat message application may enable the participant to select the highlighted tags to request for details of the respective topics. In another example, an alert notice application may be employed for a voice phone call that alerts the user when a tag from the tag provider 116 is received. The alert notice application may display the tags as a list of hashtags (or other type of link) for the conversation participant. Each hashtag may be selectable by the conversation participant for retrieving detailed information about the tag.

Tag receiver 118 may receive at least one tag from the conversation participant. In aspects, tag receiver 118 may receive at least one selection of a tag (e.g. an identifier of a tag) during the course of the conversation, when the conversation participant selects at least one tag on the chat messaging application on a client computing device. Alternatively, tag receiver 118 may receive at least one selection of a tag as the conversation participant selects the at least one tag during a voice call on a client computing device. In aspects, the selection of a tag may be received over a network. The selection of a tag may be received through various different connection types such as wired and/or wireless networks that are addressable by IP-based or non-IP based addresses. The received tag may be used to retrieve and provide links to documents that are relevant to the received tag.

Link retriever 120 may retrieve at least one link to documents that relate to the received tag. In aspects, link retriever 120 may retrieve the at least one link by traversing the graph database 126 to read a node associated with the tag, and use an edge from the tag node to access at least one document link node. An access control list for document associated with the document link may be identified by traversing an edge from the document link node. The access control list for the document may be used to confirm that the requesting conversation participant has an access permission to access the document that is related via an edge from the document link node.

In some aspects, link retriever 120 may retrieve a link when there is at least one document that the participant is granted an access based on the access control list for the document in the graph database. For example, link retriever 120 may retrieve a tag node that relates to a tag "XYZ," when the tag "XYZ" is requested to receive. Link retriever 120 may look up the graph database to retrieve a link node containing a link to a document that relates to the tag "XYZ" from a graph database. In some aspects, link retriever 120 may exclude links to documents related to the tag "XYZ" for the conversation participant, when the access control list of documents related to the tag "XYZ" does not grant the conversation participant an access to the document. In effect, link retriever 120 may retrieve links to a document that is accessible by the participant.

Link provider 122 may provide one or more retrieved links to a participant to the conversation and/or the participant that has requested for the links. There may be one or more links to documents, which have been retrieved by link retriever 120. Link provider 122 may provide a list of links to the conversation participant. For example, a chat messaging application that the participant uses on a client computing device may receive a list of links provided by the link provider 122. The chat messaging application may display the links for the conversation participant. The chat message application may enable the participant to select the highlighted links to display documents and details of the respective topics. In another example, an alert notice application, which the conversation participating may be using on a client computing device during a voice phone call, may receive the links provided by the link provider 122.

In aspects, link provider 122 may provide one or more links to the selected documents linked from graph database 126, instead of actual documents. The links may be sent to requestors by network 106. The links may be provided in various forms including but not limited to Universal Resource Locator (URL), IP address with or without port number, Universal Resource Identifier (URI), a web page address, one or more index numbers, names, path names and combinations of the forms. When recipients of the link attempts to access documents that are associated with the links, the conversation assistance application may require user authentication to the requestor before allowing access to the documents. For example, the conversation assistance application may require the requestor to enter user name and password for one-factor authentication, as well as additional passcode for two-factor authentication, and yet another parameter such as biometrics for three-factor authentication. In some aspects, documents may be provided to requestors if authentication is successful at the time that the link is used to access the documents. For example, a recipient of the link provided by the link provider 122 may forward the received link to another person or requestor who attempts to access the documents as pointed by the link. The conversation assistance application may challenge the requestor with authentication, and may reject to provide the document to the requestor with the link if the authentication fails.

In aspects, access control list 128 may contain access control lists for documents stored in document storage 130. Access control list nodes in a graph database 126 may link to access control lists 128. An access control list may comprise a list of people, group and organization with respective accessibility rights to a document.

In an example, document storage 130 may store web content, electronic files and document, as well as one or more of their respective attributes and properties. Such an exemplary data store may store documents and their metadata. In some aspects, metadata of a document may comprise attributes and properties of the documents, such as but not limited to, one or more index numbers associated with the document, a name of the document, an author of the document, editors of the document, creation date and time, last modified date and time, document type (e.g. text, image, video, audio, composite, etc.) The content of the documents may be of various media type such as text, image, video, audio and combinations of different media types. Metadata of a document may be one or more attribute-value pairs and properties of the document. For example, metadata may comprise an index number of the document, a creating date and time, last revised date and time of the document, identity of a creator and an editor of the electronic file, and a name of the document. In some aspects, metadata of a document may be stored as property nodes within the graph dataset instead of document storage 130. In some aspects, transcribed conversations may be stored in document storage 130 as the conversation assistance application 110 provides tags and links to related documents for the conversations.

As should be appreciated, the various methods, devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
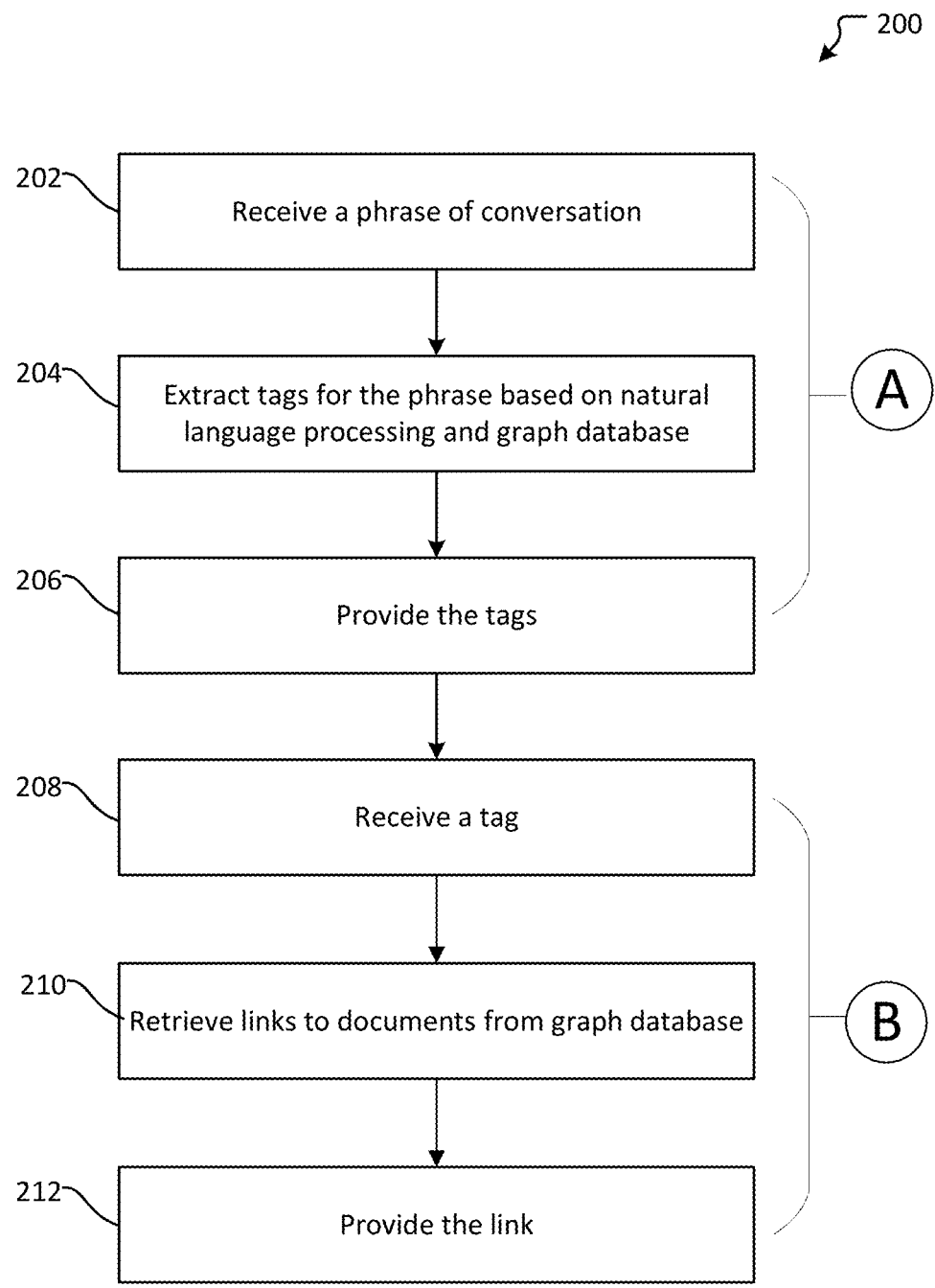
FIG. 2 illustrates a method of assisting conversations using a graph database.

FIG. 2 illustrates a method for automatically assisting conversations using a graph database. In examples, a single device (comprising one or more components such as processor and/or memory) may perform the processing described in a system 100 and a method 200 respectively. Alternatively, operations of the method 200 may be performed by multiple devices in electronic communication with one another.

Method 200 begins with receive conversation operation 202, receiving one or more terms or phrases (e.g., in spoken word or text) from a participant of a conversation. For example, a phrase may be received from network 106 by a conversation assistance application 110 in FIG. 1. In aspects, the phrase may originate from application programs executing on a computing device, such as computing devices 104 of FIG. 1, through user interactions, and transmitted to a server computing device, such as server computing device 108 of FIG. 1, via a network. A phrase may include, but not limited to, texts and words as extracted from images, video, audio, combinations of thereof. A conversation may include, but are not limited to a person-to-person conversation, a person-to-bot conversation, and the like. A conversation may include one or more participants of the conversation receiving live data feed such as price and other status monitoring ticker texts, text data that has been extracted from photos and video streaming.

At extract tag operation 204, one or more tags may be extracted based on analyzing the received phrase. In some aspects, a received phrase may be expressed in natural language. Entities from the received phrase may be extracted using a natural language understanding processor. In some example, the entities may be extracted based at least in part on a context of the conversation. In some aspects, the natural language processing may be specific to a certain subject based upon the context of the conversation or participants, e.g., specific to a medical field, engineering practice, etc.

In some aspects, at extract tag operation 204, one or more tags such as, but not limited to, keywords and topics from graph database may be retrieved by looking up the graph database. In aspects, the tags may be associated with one or more entities identified in the conversation. For instance, the graph database may be traversed to identify and retrieve at least one tag that matches with an extracted name of the tag. The extract operation 204 may look up and receive one or more tags that are stored as nodes in the graph database.

In some aspects, at extract tag operation 204, a tag for the conversation participant may be extracted when there is at least one document that is accessible to a participant in the conversation. In examples, access to a document may be determined using an access control list for the document. For example, a tag "XYZ" from a phrase received for a conversation may extracted. The tag "XYZ" may be retrieved from a graph database. However, the information (e.g., documents, links, data) associated with the tag "XYZ" may not be accessible to a participant according to an access control list associated with the tag "XYZ." In effect, at extract operation 204, only tags with at least one link to a document that is accessible by one or more of the participants may be extracted at operation 204. If none of the data associated with a tag is accessible to a participant, no tags may be extracted at Tag extract operation 204.

At provide tag operation 206, at least one tag may be provided as a tag and/or a topic related to a conversational phrase or term. The at least one tag may be a list of words. Additionally or alternatively, the list of tags may comprise hashtags, where words for a tag may be preceded by a hash character (#). In some aspects, provide tag operation 206 may provide not provide any tags if no tags are extracted by the extract tag operation.

In aspects, during provide tag operation 206, a list of tags may be provided over a network. For example, a chat messaging application that the participant uses on a client computing device may receive the tags as a result of the provide tag operation 206. The chat messaging application may display the tag as a list of hashtags for the conversation participant. Alternatively, the chat messaging application may highlight the tags in the phrases of the conversation through the use of bold, italic, or underlined fonts, colors, graphics, etc. The chat message application may enable the participant to select the highlighted tags to display details of the respective topics. In another example, an alert notice application that the conversation participating may be using on a client computing device during a voice phone call may receive the tags as a result of the provide tag operation 206. The alert notice application may display the tags as a list of hashtags for the conversation participant. Each hashtag may be selectable by the conversation participant for retrieving detailed information about the tag.

At receive tag operation 208, at least one tag from the conversation participant may be received. In aspects, at receive tag operation 208, at least one selection of a tag (e.g. an identifier of a tag) may be received during the course of the conversation, when, for example, the conversation participant selects at least one tag on the chat messaging application on a client computing device. Alternatively, at receive tag operation 208, at least one selection of a tag may be received as the conversation participant select the at least one tag during a voice call on a client computing device. In aspects, the selection of a tag may be received over a network. The selection of a tag may be received through various different connection types such as wired and/or wireless networks that are addressable by IP-based or non-IP based addresses.

At retrieve link operation 210, the graph database may traversed retrieve at least one link to a document that the conversation participant can access. For instance, a node with a type having the requested tag may be selected by traversing the graph database. At least one link may be retrieved when there is at least one document that the participant is granted an access based on the access control list for the document in the graph database. For example, at retrieve link operation 208, a tag node that relates to a tag "XYZ" may be retrieved from the graph database when the tag "XYZ" is received at the receive tag operation 208. And, at retrieve link operation 210, a link to a document that relates to the tag "XYZ" from a graph database may be retrieved. However, the information (e.g., documents, links and data) associated with the tag "XYZ" may not be accessible to a participant according to an access control list associated with the tag "XYZ". In effect, at retrieve link operation 210, only links to a document that is accessible by one or more of the participant may be retrieved at operation 204. If none of the data associated with a tag is accessible to a participant, no link may be retrieved from the graph database.

At provide link operation 212, at least one link to documents may be provided to the requesting conversation participant. There may be one or more links to documents, which have been retrieved at retrieve link operation 210. A list of links may be provided, at provide link operation 212, to the conversation participant of the conversation. For example, a chat messaging application that a participant uses on a client computing device may receive a list of links, as a result of the provide link operation 212. The chat messaging application may display the links for the conversation participant. The chat message application may enable the participant to select the highlighted links to display documents and details of the respective topics. In another example, an alert notice application, which the conversation participating may be using on a client computing device during a voice phone call, may receive the links based on the provide link operation 212. Alternatively, provide link operation 212 may provide no link to the requesting participant if there is no link to documents available for the requesting participant.

In aspects, at provide link operation 212, one or more links to the selected documents or information linked from graph database 126 may be provided. The links may be sent to requestors by network 106. The links may be provided in various forms including but not limited to Universal Resource Locator (URL), IP address with or without port number, Universal Resource Identifier (URI), a web page address, one or more index numbers, names, path names and combinations of the forms. When recipients of the link attempts to access documents that are associated with the links, the conversation assistance application may require user authentication to the requestor before allowing access to the documents. For example, the conversation assistance application may require the requestor to enter user name and password for one-factor authentication, as well as additional passcode for two-factor authentication, and yet another parameter such as biometrics for three-factor authentication. In some aspects, documents may be provided to requestors if authentication is successful at the time that the link is used to access the documents. For example, a recipient of the link as a result of the provide link operation 212 may forward the received link to another person or requestor who attempts to access the documents as pointed by the link. The conversation assistance application may challenge the requestor with authentication, and may reject to provide the document to the requestor with the link if the authentication fails. In alternate embodiments, the documents themselves may be provide at operation 212 instead of a link to the document.

As illustrated in FIG. 2, operations from the receive phrase operation 202 through the provide tags operation 206 may be grouped as a method for providing tags from conversational phrases (A). Moreover, the operations from the receive tag operation 208 through provide links 212 may be grouped as a method for providing links to documents based on received tags (B). For instance, the method for providing tags from conversational phrases (A) and the method for providing links to documents based on received tags (B) may be processed sequentially as illustrated in FIG. 2. Additionally or alternatively, the method for providing links to documents based on received tags (B) may be processed repeatedly after the method for providing tags from conversational phrases (A) is processed once. For example, the method for providing tags from conversational phrases (A) may provide a tag once with the provide tag operation 206. The method for providing links to documents based on received tags (B) may be processed whenever the tag is received at receive tag operation 208, without processing the method for providing links to documents based on received tags (B) again.

As should be appreciated, operations 202-212 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3:
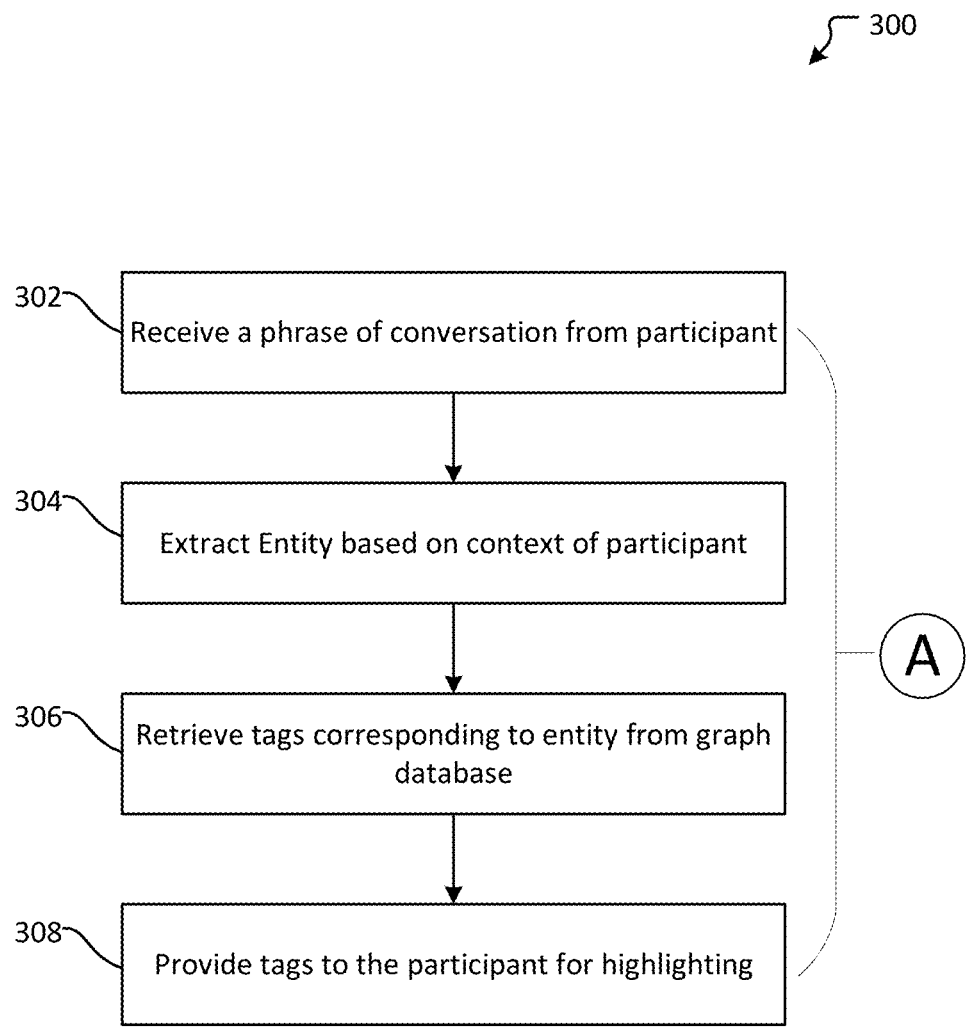
FIG. 3 illustrates a method of providing relevant tags during a conversation according to an example system.

FIG. 3 illustrates an overview of an example system for automatically assisting conversation using a graph database. In particular, overall operations based on FIG. 3 may correspond to the method for providing tags from conversational phrases (A) of FIG. 2. At receive phrase operation 302, a term or phrase of conversation may be received from one or more participants to a conversation. For instance, a participant of a conversation may register with conversation assistance application to help the participant during a conversation by providing hints and relevant information being discussed during the conversation. Alternatively, a conversation assistance application may automatically be invoked or be part of a conversational client (e.g., an instant message client, an email client, etc.). Words and phrases may be received by at the receive phrase operation 302 through a network. In some aspects, the received phrase may be in the form of text as well as voice streaming, depending on how the conversation may be taking place. The words and phrases may be in natural language.

At extract entity operation 304, natural language understanding process may be used to extract at least one entity from the received words and phrases. The entity extraction may be processed based on a context of the conversation. The context may be related to at least one domain of one or more of the participants to the conversation. In another instance, the context may be based on a domain that is common between the participant and other participants of the conversation. For instance, if the other participants of the conversation are from various departments within the company ABC, the domain of company ABC as a common domain may be used for a context to extract entities from the received words and phrases.

At retrieve tags operation 306, the graph database may traversed to locate at least one tag node that is associated with the extracted entity. For instance, the graph database may contain tag nodes, that may contain properties such as a name of the tag. A tag node may also have edges originating from the node, connecting to a node with document link node. The tag node may also have edges originating from the node, connecting to another tag node. For example, two tag nodes with names of tags may be linked by an edge if the two tags are synonyms.

At provide tag operation 308, at least one tag, which is related to the extracted entity may be provided to the requesting participant of the conversation. For example, a chat messaging application that the participant uses on a client computing device may receive the tags as a result of the provide tag operation 308. For example, a chat messaging application may display the tag as a list of hashtags for the conversation participant. Alternatively, the chat messaging application may highlight the tags in the phrases of the conversation through the use of bold, italic, or underlined fonts, colors, graphics, etc. The chat message application may enable a participant to select one or more highlighted tags to display details of the respective topics (e.g., related information, documents, etc.). In another example, an alert notice application that the conversation participating may be using on a client computing device during a voice phone call may receive the tags as a result of the provide tag operation 308. The alert notice application may display the tags as a list of hashtags for the conversation participant. Each hashtag may be selectable by the conversation participant for retrieving detailed information about the tag.

In aspects, a collection of tags may be ranked, and only a part of the ranked tags may be provided to the requesting participant of the conversation. For example, ten highly ranked tags may be provided. Ranking of tags among the retrieved tags may be generated based on relevance of respective tags to the requesting participant of the conversation. In some examples, a frequency of tags appearing during conversations by the conversation participant may be counted as statistical records. In some other examples, a frequency of tags being selected by the conversation participant may be counted as statistical records. In yet some other examples, a frequency of tags being selected by people in the group of organization in an enterprise, which the conversation participant may be associated with may be counted as statistical records. A degree of relevance on respective tags and the participants may be generated based on the statistical records.

As should be appreciated, operations 302-308 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 4:
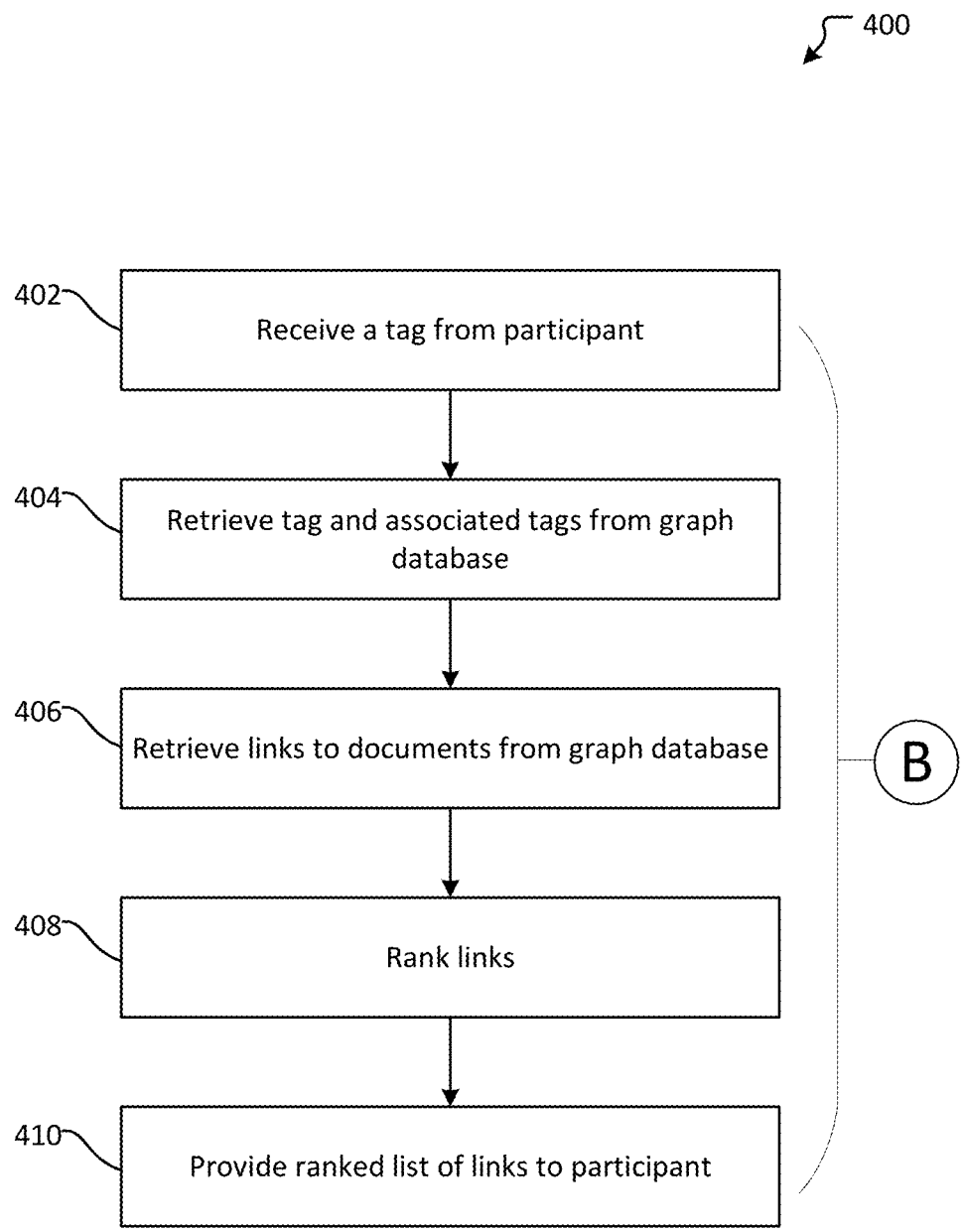
FIG. 4 illustrates a method of providing a ranked list of links to related documents to during a conversation according to an example system.

FIG. 4 illustrates an overview of an example system for automatically assisting conversation using a graph database. In particular, overall operations based on FIG. 4 may correspond to the method for providing links to documents based on received tags (B) of FIG. 2, providing a list of links to documents based on tags selected by and received from a participant of a conversation.

At receive tag operation 402, at least one tag may be received via network from a participant from a conversation. The at least one tag may consist of one or more words or a topic of the conversation taking place between the participant and other participants. For instance, the received tag may be among the tags that have previously been provided by the provide tags operation 308 in FIG. 3.

At extract tag operation 404, the graph database may be traversed to locate at least one tag node, based on a tag received from the participant at the receive tag operation 402. The retrieved tag node may contain the same tag name, or have an edge "synonym" to or from the tag node with the name. There may be more than one tag being extracted from the graph database.

At retrieve links operation 406, at least one link to documents that relate to the extracted tags may be retrieved from the graph database by identifying nodes matching the tags and/or nodes that are associated with the nodes with the tags. For instance, nodes matching the tags that have been extracted during the extract tag operation 404 may identified. Further, edges from the tag nodes may be traversed to identify associated access control list nodes. The document link nodes may comprise a link to a document and/or another node with access control list for the document. For example, at retrieve link operation 406, a tag node that relates to a tag "XYZ" may be retrieved from the graph database when the tag "XYZ" is received at the receive tag operation 404. At retrieve link operation 406 a link to a document that relates to the tag "XYZ" from a graph database may be retrieved. In some aspects, at retrieve link operation 406, links to documents relating to the tag "XYZ" for the conversation participant may be excluded when the access control list of documents related to the tag "XYZ" does not grant the conversation participant an access to the document. In effect, at retrieve link operation 406, only links to a document that is accessible by the participant may be retrieved from the graph database.

At rank link operation 408, the retrieved links to documents may be ranked. For instance, a list of links may be ranked in the order of relevance to the retrieved tags. A degree of relevance may be identified based on which tag nodes are associated with the document. For example, two tag nodes may be linked by an edge "synonym" if two tags are synonymous. The degree of synonymy may be determined based on natural language processing using specific context of the requesting participant in a specific domain. In another example, a list of links may be ranked in chronological order of document creation dates and/or document last-edit dates. In some aspects, a list of links may be ranked according to a degree of relevance of respective tags to the conversation participant. In some examples, a frequency of tags appearing during conversations by the conversation participant may be counted as statistical records. In some other examples, a frequency of tags being selected by the conversation participant may be counted as statistical records. In yet some other examples, a frequency of tags being selected by people in the group that the conversation participant may be associated with may be counted as statistical records. A degree of relevance on respective tags and the participants may be generated based on the statistical records. In some aspects, a list of links may be ranked according to a degree of relevance between respective documents and the conversation participant. In some example, the degree of relevance between respective documents and the conversation participants may be determined based on a frequency of access to respective documents by the conversation participant. In some aspects, a list of links may be ranked based on a combination of a degree of relevance of respective tags to the conversation participant and a degree of relevance of respective documents to the conversation participant.

At provide link operation 410, at least one link to documents may be provided to the requesting conversation participant. There may be one or more links to documents, which have been retrieved by retrieve link operation 406. A list of one or more links may be provided, at provide link operation 410, to a conversation participant of the conversation. In aspects, links to documents may be provided over a network. For example, a chat messaging application that the participant uses on a client computing device may receive a list of links, as a result of the provide link operation 410. The chat messaging application may display the links for the conversation participant. The chat message application may enable the participant to select the highlighted links to display documents and details of the respective topics. In another example, an alert notice application, which the conversation participating may be using on a client computing device during a voice phone call, may receive the links as a result of the provide link operation 410.

In aspects, at provide link operation 410, one or more links to the selected documents identified using a graph may be provided. The links may be sent to requestors by network. The links may be expressed in various forms including but not limited to Universal Resource Locator (URL), IP address with or without port number, Universal Resource Identifier (URI), a web page address, one or more index numbers, names, path names and combinations of the forms. When recipients of the link attempts to access documents that are associated with the links, the conversation assistance application may require user authentication to the requestor before allowing access to the documents. For example, the conversation assistance application may require the requestor to enter user name and password for one-factor authentication, as well as additional passcode for two-factor authentication, and yet another parameter such as biometrics for three-factor authentication. In some aspects, documents may be provided to requestors if authentication is successful at the time that the link is used to access the documents. For example, a recipient of the link as a result of the provide link operation 410 may forward the received link to another person or requestor who attempts to access the documents as pointed by the link. The conversation assistance application may challenge the requestor with authentication, and may reject to provide the document to the requestor with the link if the authentication fails.

As should be appreciated, operations 402-410 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 5B:
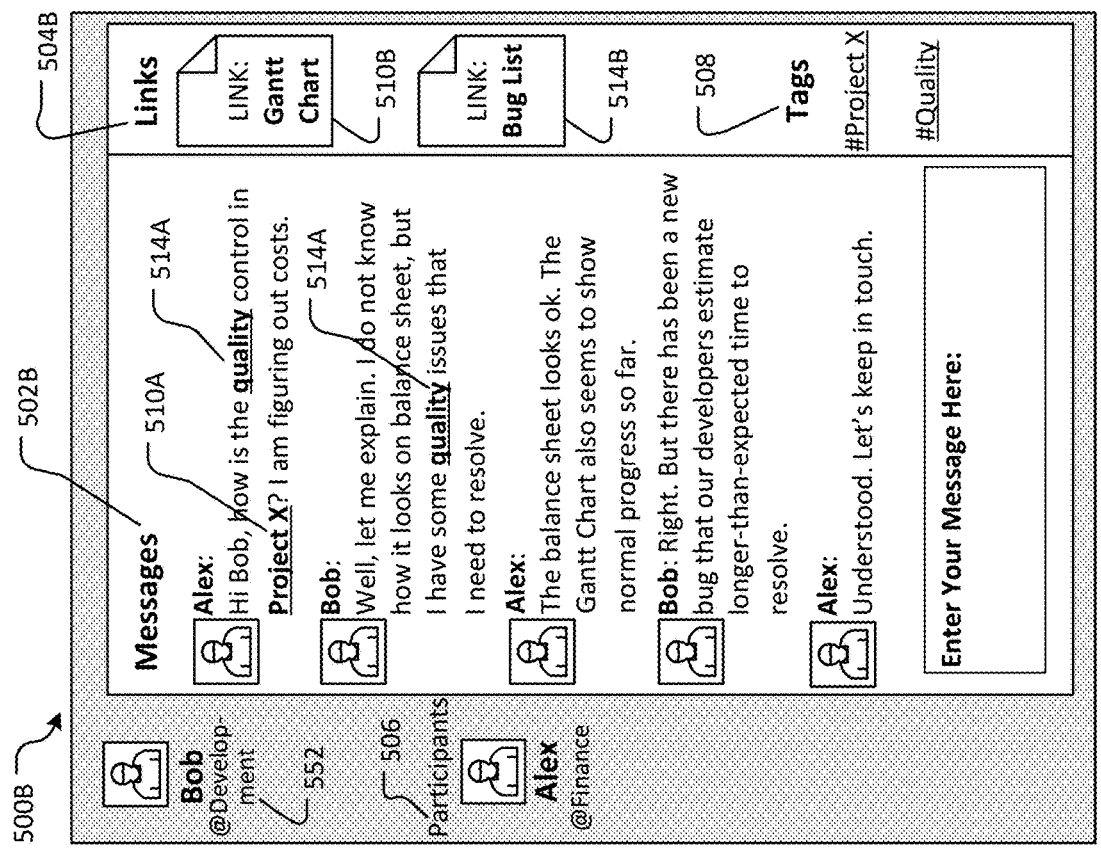
FIGS. 5A-5B illustrate graphical user interface according to an example system.
Figure 5A:
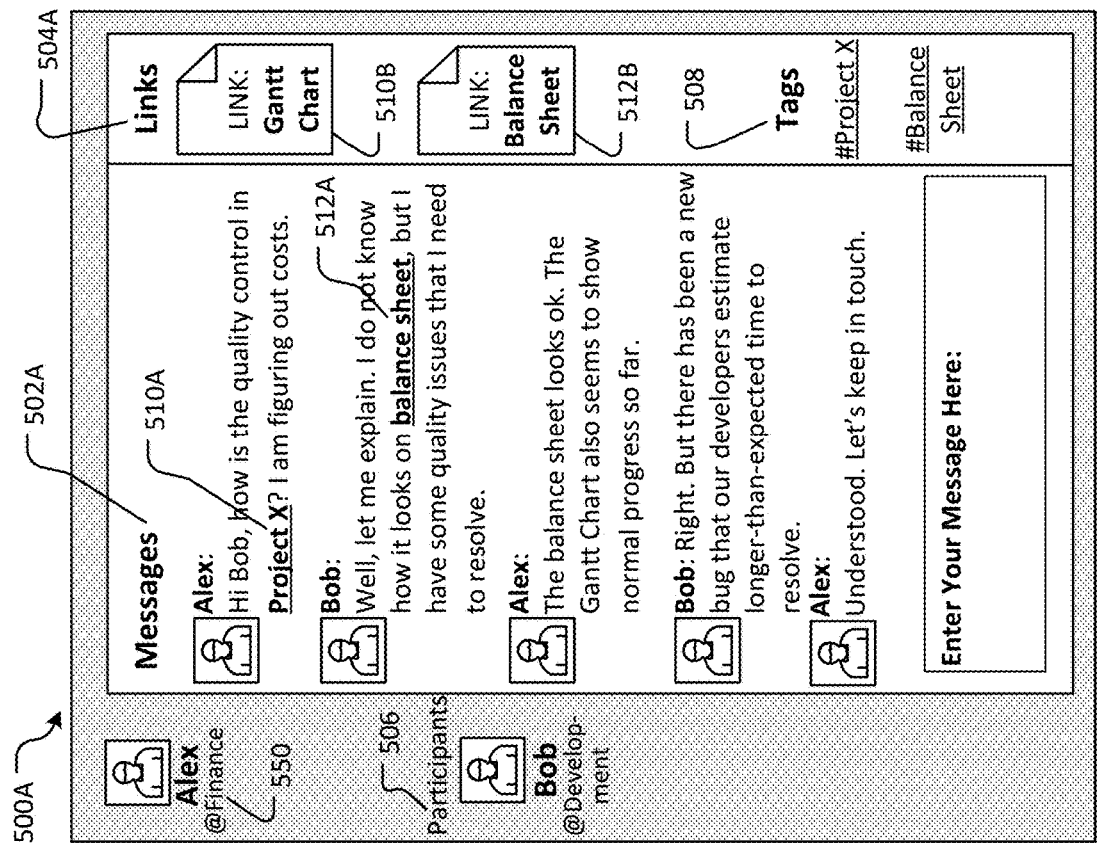

FIG. 5A and FIG. 5B illustrate examples of graphical user interface for a conversation between participants. According to the example conversation, a conversation between Alex in Finance department of company A and Bob in Development department of company A may be taking place. FIG. 5A illustrates a messaging screen provided to Alex during the conversation. FIG. 5B illustrates a messaging screen provided to bob during the same conversation.

Screen 500A shows an example screen of a messaging application that Alex may be using during a conversation. The identifier 550 for Alex indicates that the user interface 500A is being displayed to Alex. Participants section 506 shows participants of the discussion. For instance, Bob at Development department is participating in the depicted conversation. Messages section 502A lists words and phrases from the conversation that is taking place. The contents of the Messages section 502A may be a transcribed record of the conversation. The message may be updated in real-time as the conversation takes place. Each message shows a name of participant who transmits the message. For example, Alex has transmitted a message indicating "Hi Bob, how is the quality control in Project X? I am figuring out costs." The latest message may be from Alex, indicating "Understood. Let's keep in touch." There may be a section to enter new text for transmission, as indicated by the "Enter Your message Here:" instruction message. Links section 504A contains a list of links to documents that may be relevant to the topic of the conversation. For example, a link to a document titled "Gantt Chart" 510A and a link to a document titled "Balance Sheet" 512B may be listed, each represented by an icon. Tags section 508 may list hashtags and topics that are related to the conversation. The displayed tags may be selectable. Upon selection of the tags, one or more associated documents or information may be displayed. In other aspects, the links may not be displayed in Links section 504A. Instead, the relevant documents may be accessed by selecting a highlighted term in the conversation, such as Project X 510A or balance sheet 512A.

Similarly in FIG. 5B, an example of user interface for a messaging application used by Bob from Development department 552 is shown. Bob@Development department 552 indicates that the depicted user interface is displayed to Bob during the conversation, and an icon of the participant Alex of Finance 506 may be displayed. The message section 502B lists a thread of communication between Bob and Alex, followed by an input section to enter messages. The links section 504B displays a list of links to documents. For instance, there may be a link to a document "Gantt Chart" 510B and a link to a document Bug List" 514B. The Tags section 508 displays a list of tags and links to tags as identified by the conversation assistance program.

For example, aspects disclosed herein may provide additional information to both Alex and Bob during their conversation. In some aspects, tags are extracted and highlighted based on contexts specific to each participant (e.g. each Alex and Bob). Different tags may be identified among different participants from the same conversation. For example, tags as identified for Alex may be different from the tags identified for Bob even though they participate in the same conversation. In FIG. 5A, two tags are identified and highlighted in bold for Alex with underline during the conversation: "Project X" 510A and "balance sheet" 512A. For example, a tag "Project X" may be identified because Alex and Bob belong to the same company, and Project X may be relevant to a project at the company. Moreover, a tag "balance sheet" may be extracted as a tag for Alex because Alex is a part of Finance group and the term "balance sheet" is relevant to the area of profession at the company, even though the phrase "balance sheet" is mentioned by Bob. Accordingly, links to documents may be identified and provided to Alex based on the two tags: Gantt Chart 510B for a tag "Project X" 510A and Balance Sheet 512B for a tag "balance sheet" 512A. The Tags section 508 may list the two tags as links to relevant set of documents.

In FIG. 5B, two tags have been identified as relevant to Bob's conversation with Alex. First, "Project X" may be identified as a tag for Bob because of importance of Project X. Second, a word "quality" has been identified as a tag because the word quality is highly relevant to Bob who is a member of Development group. As a link for assistance, a link to a document Gantt Chart 510B may be identified as being associated with a tag "Project X," as shown in the Links section 504B. A link to document Bug List 514B may be selected and displayed to Bob as the document Bug List may be relevant to a tag "quality."

In some aspects, tags may be highlighted and new links to documents may be added to the messaging screen as a conversation continues between participants. In aspects the extraction, retrieval, and providing tags and links to related documents may be processed concurrently as the conversation takes place. Real-time processing of assisting conversations is aided through the use of a graph database for looking up information such as tags, participant profiles as well as links to documents with access control list.

As should be appreciated, the various methods, devices, components, etc., described with respect to FIG. 5A and FIG. 5B are not intended to limit the systems and methods to the particular components described. Accordingly, additional topology configurations may be used to practice the methods and systems herein and/or some components described may be excluded without departing from the methods and systems disclosed herein.

Figure 6:
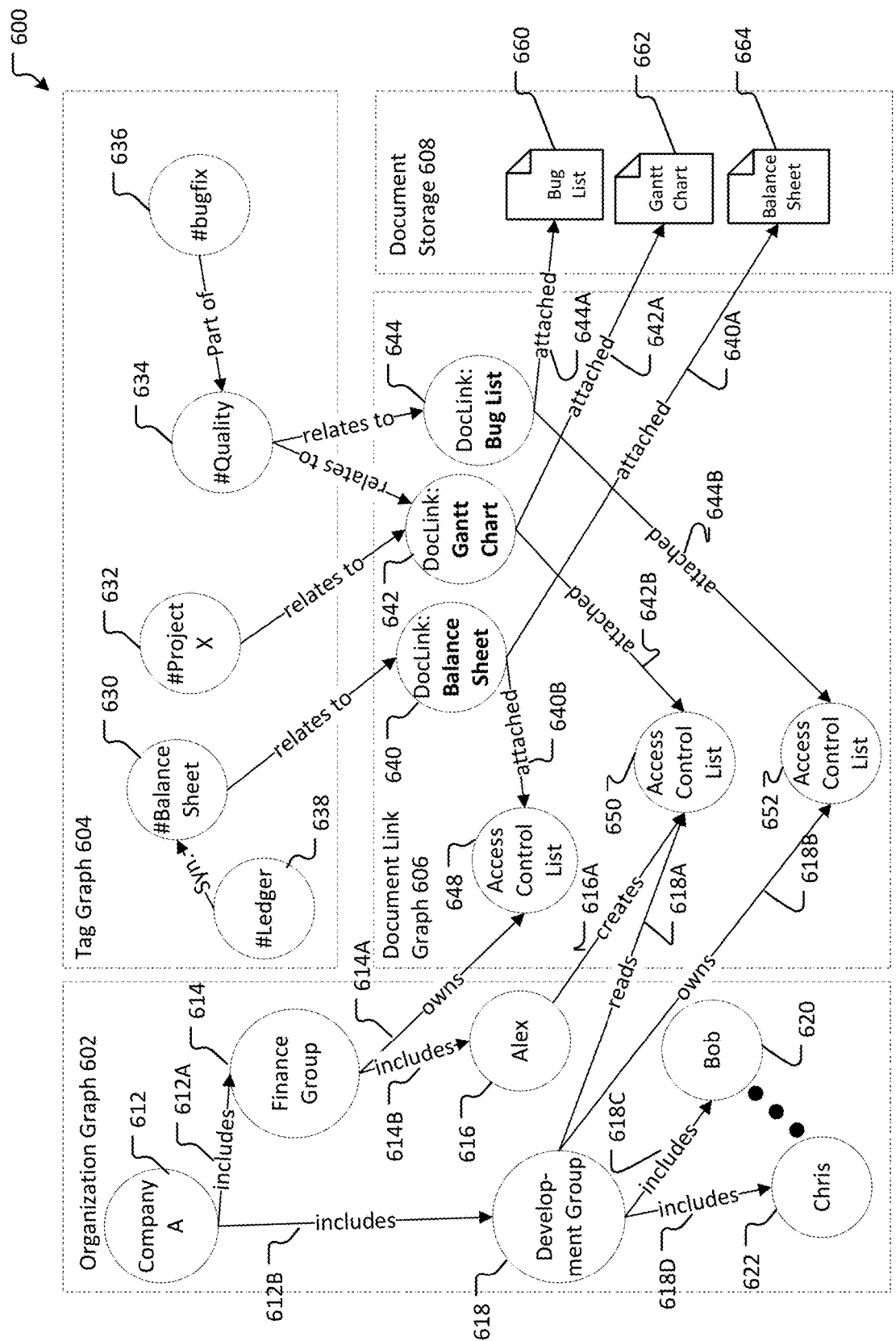
FIG. 6 illustrates examples of graph structures according to an example system.

FIG. 6 illustrates an example of graph structures according to an example system. According to the example, a graph may comprise three sections: organization graph 602, topics (tags) graph 604 and document link graph 606. Each of the sections may serve different purposes for conversation assistance application to retrieve tags, refer to access control lists for documents that relate to the tags, and to retrieve links to documents for the conversation participants. FIG. 6 illustrates various related nodes and edges for the purpose of illustration only. Aspects of the disclosure may be employed using any type of graph using nodes and edges to relate entities.

Organization graph 602 may contain nodes and edges that relate to people and their associated organizations. As illustrated in the provided example, node "Company A" 612 may have two edges originating from the node, an edge "includes" 612A may connect to a node Finance Group 614, and another edge "includes" 612B may connect to a node Development Group 618. Finance Group and Development Group are both parts of the Company A according to the example. The node Finance Group 614 has two edges, one edge "owns" 614A connect to Access Control List 648. The other edge "includes" 614B connects to a person node Alex 616. While not shown, there may be two-way relationships between the different nodes. For example, another edge "is part of" may original from person node 616 to node 614 to indicate that Alex is part of the Finance Group. The node Development Group 618 may have four edges originating from the node. An edge "reads" 618A connect to a node Access Control List 650. A second edge "owns" 618B connects with a node Access Control List 652. The third edge "includes 618C" connect to a person Bob 620. Last, the edge "includes" 618D may connect to a person node Chris 622. The example illustrates that Alex is a member of Finance Group while Bob and Chris are members of Development Group.

Tag Graph 604 may comprise nodes and edges to store tags and topics of documents in the graph database. As illustrated in FIG. 6, for example, there may be five tag nodes: #Balance Sheet 630, #Project X 632, #Quality 634, #bugfix 636 and #Ledger 638. There may be edges that link two tags. For instance, there may be an edge that originates from a node #Ledger 638 to a node #Balance Sheet 630 identifying the terms as synonymous. In addition, there may be an edge "Part of" from a node #bugfix 636 to a node #Quality 634 because a tag bugfix may be a part of quality. As illustrated tag nodes may have edges originating from the tag nodes and connect to nodes that are links to documents.

In some aspects, a document and a tag may be added automatically or manually. For example, when a new document is registered to the system 600, contents of the new document may be parsed, and entities may be extracted according to natural language processing and/or dictionaries. The extracted entities may be associated with either existing tags or new tags when the entities are not found among the existing tags. A link node to the new document may be created, and at least one property for access control to the new document may be created, and the associated nodes and edges may be created. The new tags may be created according to the extracted entities, and edges may be created to other existing tags based on semantic relationships among the tags. New edges to the link node may be created to originate from the associated tag nodes.

In some aspects, a new node may be manually added in association with at least one document through user interactions. While not shown in figures, a list of links to documents may be provided to the conversation participant based on at least one selection of tags during the conversation. There may be user interaction method such as a text input area and area selections may be provided at least to receive a selection of at least one link to a document along with a text string input. As a result of the user interaction, a new tag may be created when the tag does not exist in the system 600, and a new edge to link from the new tag to the selected link to a document may be created. In addition, there may be a background processing to parse tags to create new edges for associating among tags when there is semantic association.

Document link graph 606 may contain nodes and edges, which are related to maintaining links to documents and access control lists in the graph database. For example, there may be a node with a type document link (shown as "DocLink") in the graph database. Each document link node may have at least two edges originating from the node. One is an edge "attached" to a corresponding document. The other edge may be an "attached" edge to access control list node. For example, a document link node "Balance Sheet" 640 has to two edges originating from the node: an "attached" edge 640A may connect to a document "Balance Sheet" 664 in document storage 608, an "attached" edge 640B may connect to an access control list node 648 for the balance sheet document. The "owns" edge 614A originating from Finance Group 614 may indicate that the document Balance Sheet is owned by Finance Group. The tag node "#Balance Sheet" 630 has an edge "relates to" to the document link Balance Sheet 640. The "relates to" edge indicates that the document is linked from the topic.

A document link node "Gantt Chart" 642 has two edges originating from the node. An "attached" edge 642A may connect to a document "Gantt Chart" for Project X. The access control list node 650 for this document is linked by an edge "attached" 642B. As illustrated, Alex has the creator permission and the Development Group has read permission to this document.

A document link node "Bug List" 644 has two edges from the node. An attached edge 644A connects to a document Bug List 660. The "attached" edge 644B connect to the document's access control list. The bug list document is owned by Development Group 618. As illustrated by the "owns" edge 618B from Development Group 618 and Access Control List 652.

Referring to FIGS. 5A and 5B, conversation assistance application may identify two tags, "Project X" and "balance sheet" for Alex from Finance Group as topic keywords, based on traversing graphs related to the organization and tags. Similarly but also distinguishably, tags "Project X" and "quality" may be identified as tags for Bob from Development Group. Different documents have been identified based on the different tags for Alex and Bob. A link to Grant Chart 510B may be provided to both Alex and Bob, while a link to the balance sheet 512B and a link to Bug List 514B are uniquely provided between the two participants of the conversation based upon their context.

As should be appreciated, the various methods, devices, components, etc., described with respect to FIG. 6 is not intended to limit the systems and methods to the particular components described. Accordingly, additional topology configurations may be used to practice the methods and systems herein and/or some components described may be excluded without departing from the methods and systems disclosed herein.

In aspects different instances or sets of graph databases and graph structures for respective participants of a conversation may be used to assist conversation. Use of completely separate graph databases as separate tenants of graph databases may be effective in securely managing organizations, tags and documents. Alternatively, sections of the graph databases may be distributed at locations and computing devices that are in proximity of conversation participants to minimize possible latencies caused by data transmission through the network. Moreover, document storages may be distributed to optimize performance based on the pattern of accessing documents through links. For example, some documents may be accessed more frequently by people and groups with read permissions. These documents may be provided at high read performance if the document storage is placed closer in location to the readers.

Figure 7A:
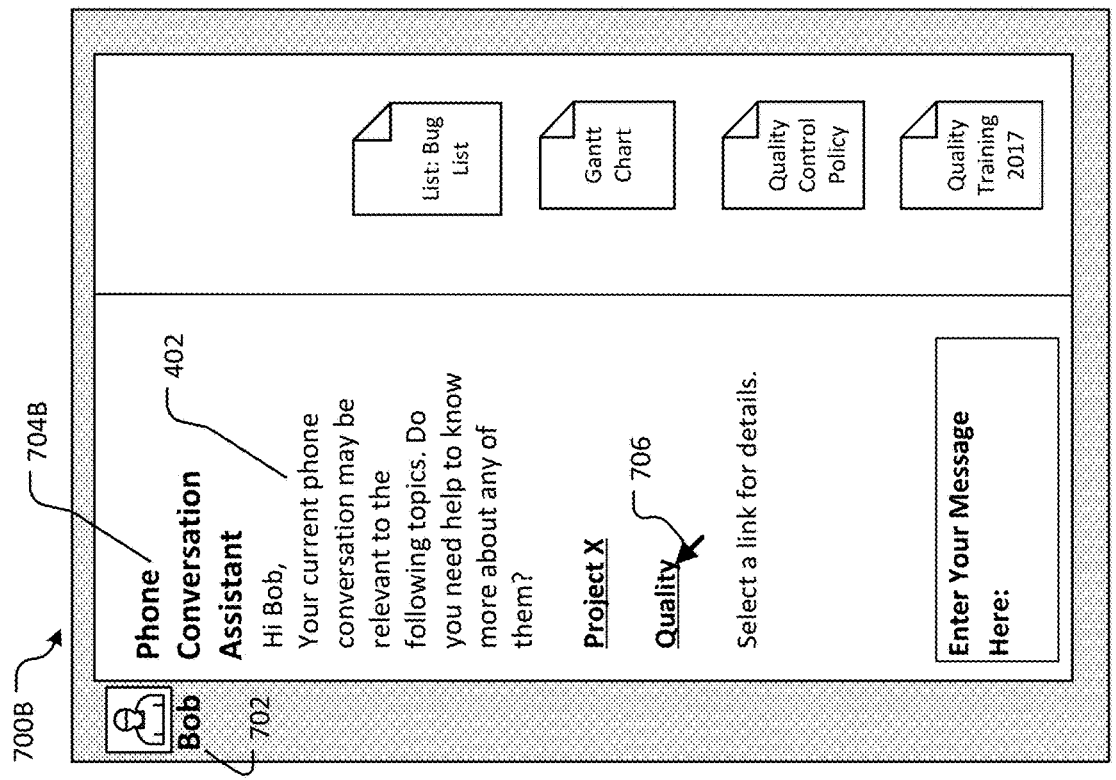
FIGS. 7A-7B illustrate examples of graphical user interface according to an example system.
Figure 7B:
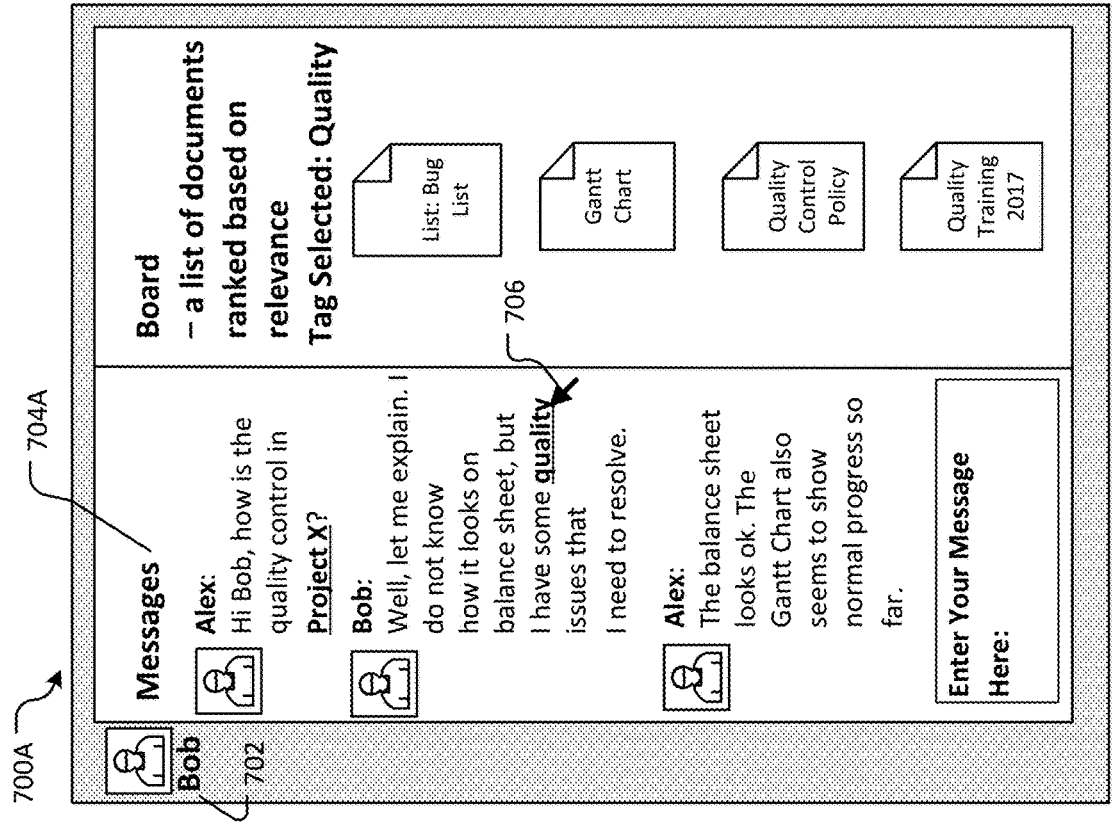

FIG. 7A and FIG. 7B illustrate two example screens of a graphical user interface, illustrating links to document, which are associated with topics from different types of conversations. FIG. 7A illustrates an example of providing a Board, which is a list of links to documents, ranked based with relevance to a tag "quality" to Bob. According to the example, a Board is a collection of links to documents based on a topic or at least one tag. The board may be displayed when a user selects a tag from a log of conversation among participants. For instance, the mouse cursor 402 has selected a word "quality" 706. The Board may be displayed when a tag, such as "quality" is selected. The Board contains a list of links to documents according to a specific tag. FIG. 7A shows a link to documents Bug List, Gantt Chart, Quality Control Policy and Quality Training 2017 materials (not shown in FIG. 6) of Company A. All of these documents may be related to a selected tag, which is "quality" in the example.

FIG. 7B illustrates a graphical user interface that Bob may use, while voice phone call conversations take place. For example, instead of transcribing all the conversation, the conversation assistance application as Phone Conversation Assistant 704B may send a message to a participant along with tags and links to documents. There may be a message to Bob "Hi Bob, Your current phone conversation may be relevant to the following topics. Do you need help to know more about any of them? Project X, Quality. Select a link for details." The two tags "Project X" and "Quality" may be displayed for a selection by Bob. In the example, Bob has selected a tag "Quality" by the mouse cursor 706. Based on the selection on the tag "Quality", four links to documents may be displayed: Bug List, Gantt Chart (for Project X), Quality Control Policy and Quality Training 2017.

In some aspects, voice streaming data may be received by conversation assistance application for assisting conversations during a voice phone call. The voice streaming data may be processed for natural language recognition to convert into text and other appropriate forms to extract entities, before the extracted entities are further processed to retrieve tags from the graph database.

In some aspects, a conversation between participants may involve more than one means of communications. For instance, there may be a conversation using both a video phone call and emails at the same time. A conversation assistance program may receive phrases from both interactions, provide tags, and then provide links to further information or documents based on at least one tag received from the assisted participant. The conversation assistance program may provide assistance to a conversation that deploys both synchronous (i.e. real-time) communications and asynchronous communications.

As should be appreciated, the various methods, devices, components, etc., described with respect to FIGS. 7A and 7B are not intended to limit the systems and methods to the particular components described. Accordingly, additional topology configurations may be used to practice the methods and systems herein and/or some components described may be excluded without departing from the methods and systems disclosed herein.

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, described herein.

Figure 8:
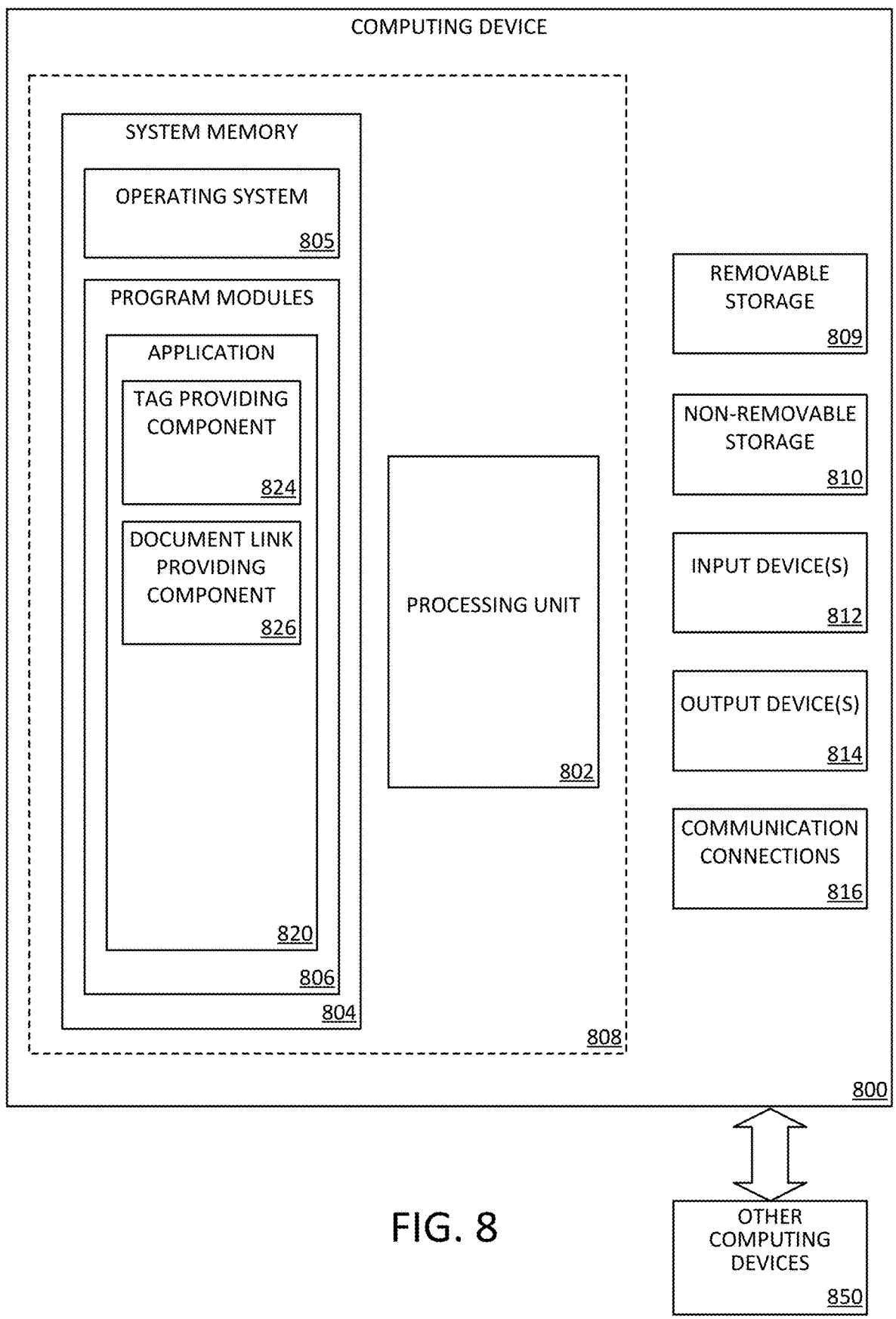
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices described above, including the client computing devices 102A-B and the server computing devices 124A-B. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for performing the various aspects disclosed herein such as tag providing component 824, a document link providing application 826. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
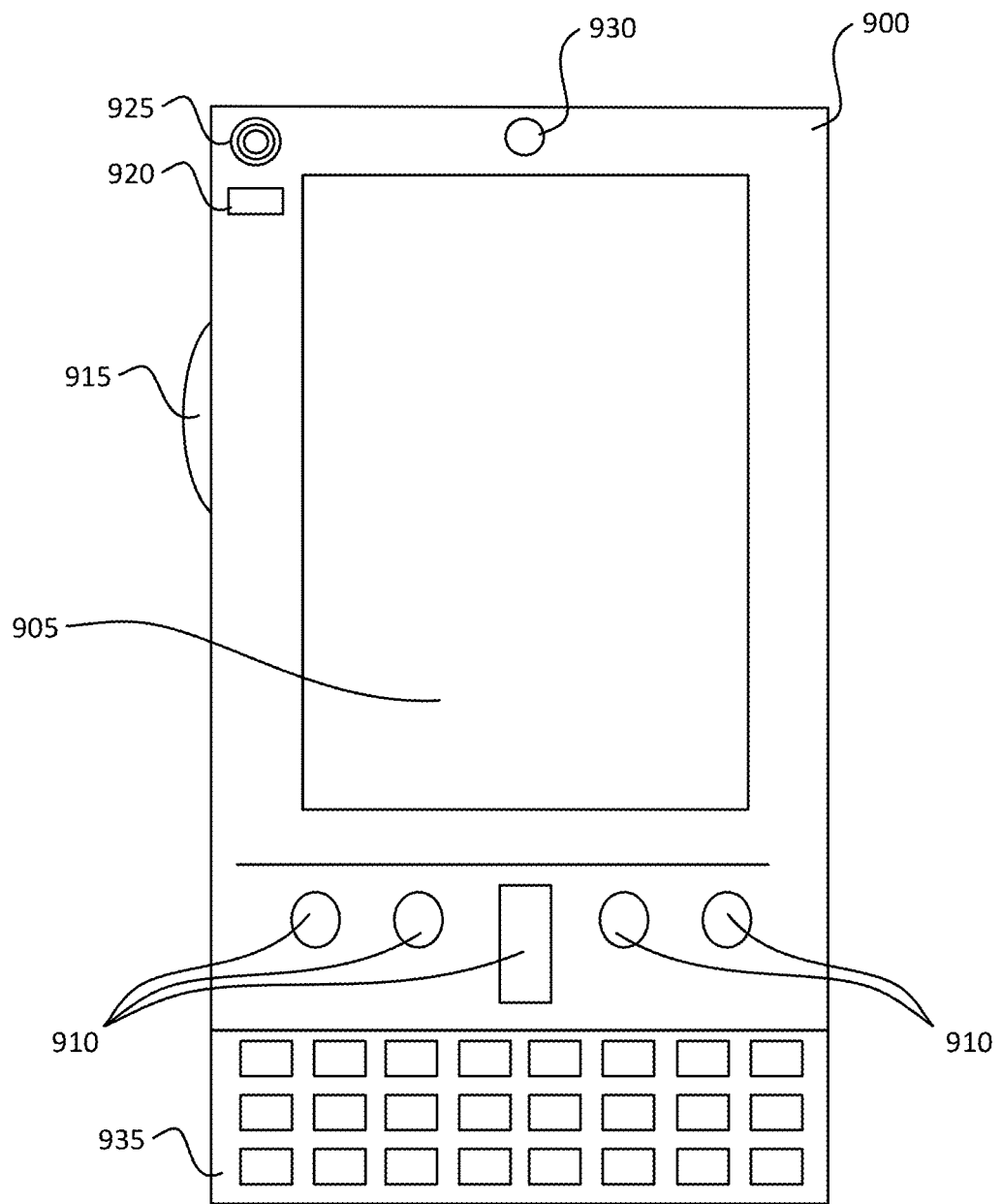
FIGS. 9A and 9B are simplified block diagrams of a mobile computing device with which aspects of the present disclosure may be practiced.
Figure 9B:
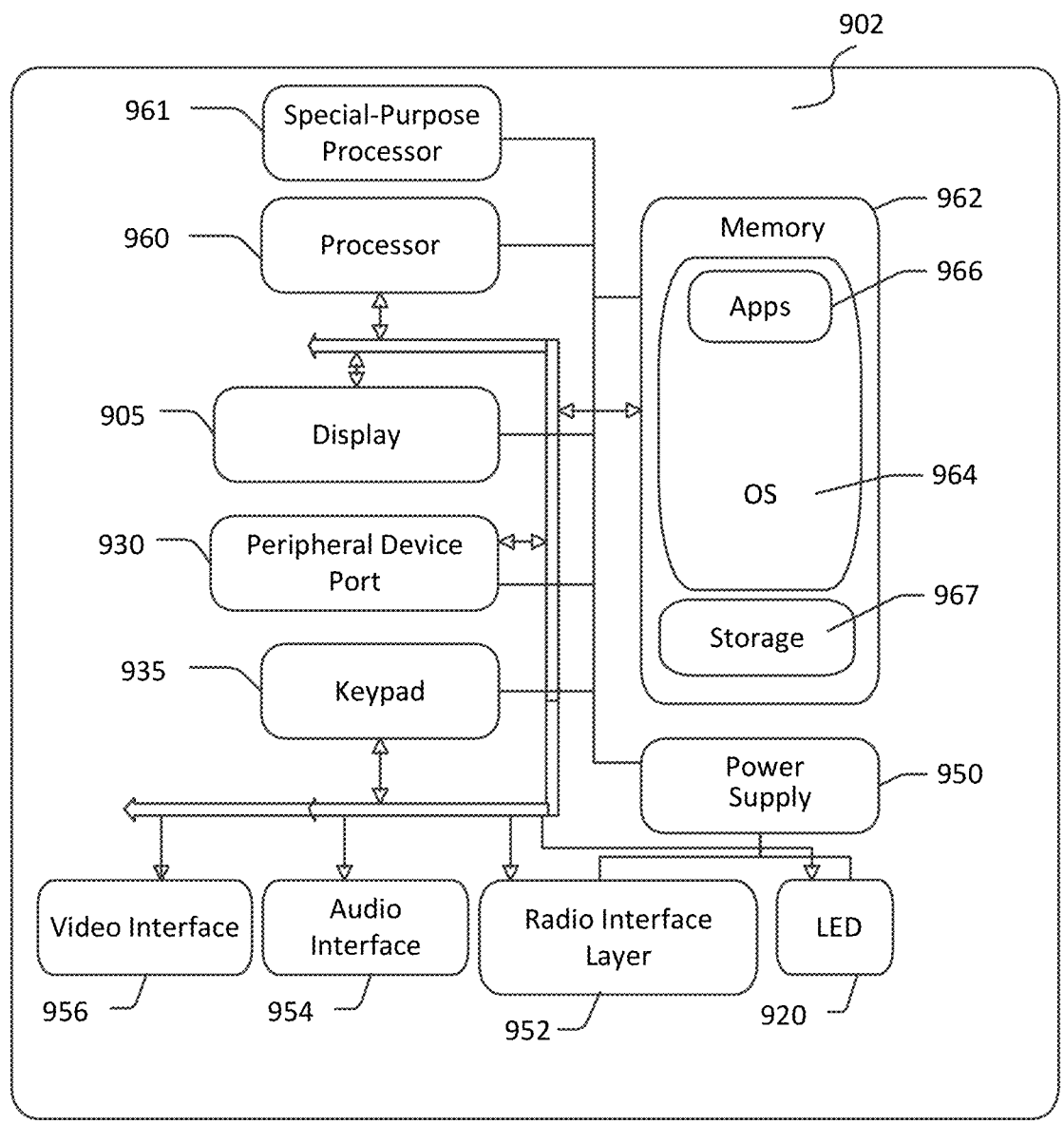

FIGS. 9A and 9B illustrate a mobile computing device 900, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
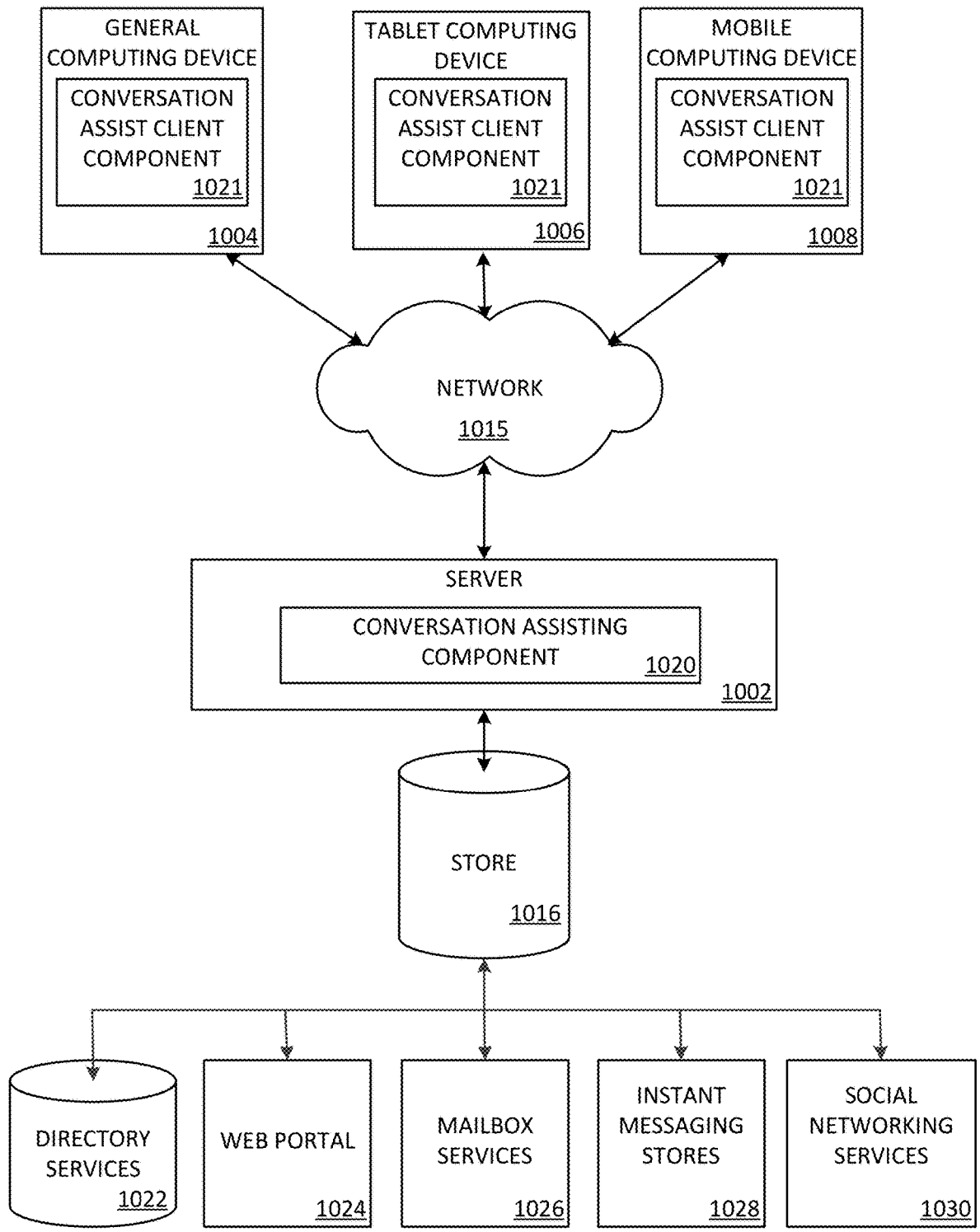
FIG. 10 is a simplified block diagram of a distributed computing system in which aspects of the present disclosure may be practiced.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. Conversation assistant client component 1021 may be employed by a client that communicates with server device 1002, and/or conversation assisting component 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

Figure 11:
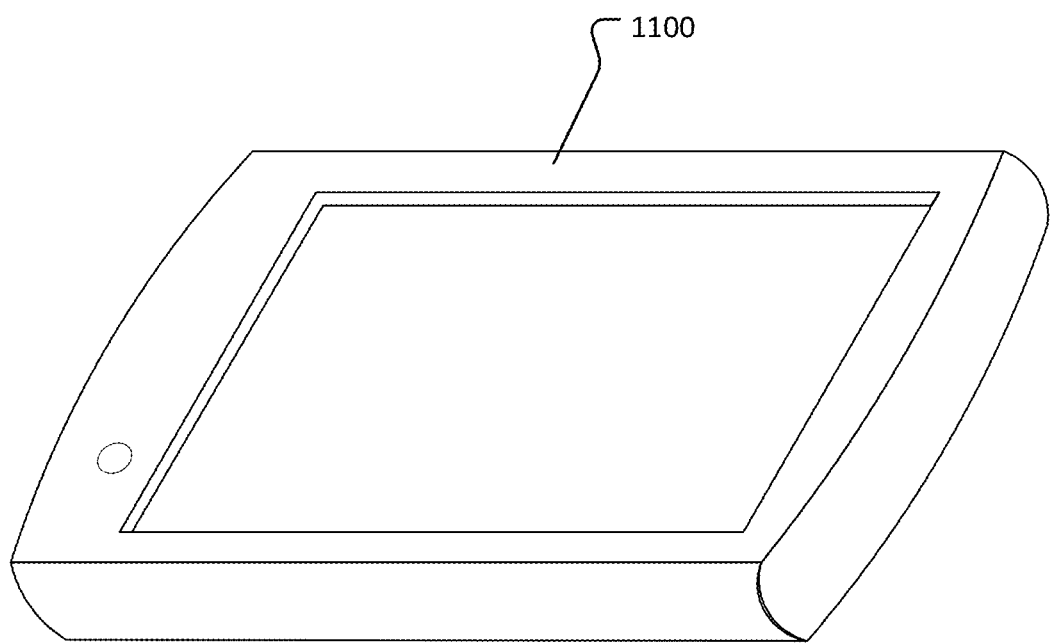
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and a memory storing instructions that when executed by the at least one processor perform a set of operations. The operations comprise: receiving at least one phrase from a conversation, extracting at least one tag from the at least one received phrase, providing the at least one tag, receiving a tag, based on the received tag, retrieving links to documents from at least one graph database, and providing the links to documents. The operation may further comprise receiving identity of a participant of the conversation, wherein extracting at least one tag comprises extracting at least one entity from the received phrase based on natural language recognition, and based on the extracted at least one entity, retrieving at least one tag from at least one graph database. The operation may yet further comprise receiving identity of a participant of the conversation, wherein retrieving links to documents comprises retrieving tag nodes from the at least one graph database, based on the retrieved tag nodes, retrieving at least one link to documents associated with the retrieved tag nodes, and ranking the retrieved at least one link to documents based on relevance to the extracted at least one entity.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system, comprising:
   at least one processor; and
   a memory storing instructions that when executed by the at least one processor perform operations for assisting conversations, the operations comprising:
   receiving at least one phrase from a conversation between a first participant and a second participant;
   extracting a tag based on the at least one received phrase, wherein extracting the tag comprises:
   extracting at least one entity from the received at least one phrase based on natural language recognition, wherein the natural language recognition is based on at least one of a first domain of the first participant or a second domain of the second participant; and
   based on the extracted at least one entity, retrieving the tag from at least one graph database;
   retrieving a first set of links to a first subset of documents for the first participant from the at least one graph database based on: the tag, the first domain, and access privileges for the first participant to the documents;
   retrieving a second set of links to a second subset of the documents for the second participant from the at least one graph database based on: the tag, the second domain, and access privileges for the second participant to the documents; and
   providing the first set of links to the first participant and the second set of links to the second participant.

2. The system of claim 1, wherein retrieving the first set of links to the first subset of the documents for the first participant and the second set of links to the second subset of the documents for the second participant comprises:
   retrieving tag nodes from the at least one graph database;
   based on the retrieved tag nodes, retrieving at least one link to at least one of the documents associated with the retrieved tag nodes; and
   ranking the retrieved at least one link to the at least one of the documents based on relevance to the extracted at least one entity.

3. The system of claim 1, wherein the tag is associated with at least one document.

4. The system of claim 1, wherein the operations further comprise identifying at least one common domain context among the first participant and the second participant to the conversation, wherein the natural language recognition is based on the at least one common domain context.

5. The system of claim 1, wherein the at least one graph database comprises a tag graph, and wherein the tag graph comprises a tag node and an edge originating from the tag node to a document link node.

6. The system of claim 1, wherein the at least one graph database comprises a document link graph, the document link graph comprising a document link node, at least one edge from the document link node to a document node, and at least one edge from the document link node to an access control node.

7. A method for automatically assisting conversation among participants using a graph database, the method comprising:
   receiving identities of participants of a conversation, wherein one of the participants is a requesting participant;
   receiving a phrase from the conversation;
   extracting a tag from the phrase;
   receiving a selection of the tag from the requesting participant;
   based on the tag and the identity of the requesting participant, retrieving a set of links to at least a subset of electronic files for the requesting participant from a plurality of graph databases, wherein the plurality of the graph databases comprise:
   a first graph database comprising organizational information about the participants that includes access control information regarding access to the electronic files;
   a second graph database comprising relationships between the tag and other tags; and
   a third graph database comprising links to the at least the subset of electronic files, wherein the second graph database further comprises relationships between at least the tag and the links in the third graph database; and
   based on access control information for the requesting participant, providing the set of links to the at least the subset of electronic files to the requesting participant.

8. The method of claim 7, the method further comprising:
   receiving identity of a participant of the conversation, wherein extracting the tag comprises:
   extracting at least one entity from the received phrase based on natural language recognition; and
   based on the extracted at least one entity, retrieving the tag from at least one graph database.

9. The method of claim 8, the method further comprising:
   receiving identity of a participant of the conversation, wherein retrieving the set of links to electronic files comprises:
   retrieving tag nodes from the at least one graph database;
   based on the retrieved tag nodes, retrieving at least one link to the at least the subset of the electronic files associated with the retrieved tag nodes; and
   ranking the retrieved at least one link to the at least the subset of the electronic files based on relevance to the extracted at least one entity.

10. The method of claim 8, wherein the tag is associated with at least one of the set of links to the at least the subset of electronic files, and wherein the requesting participant is accessible to the electronic files through the set of links to electronic files.

11. The method of claim 8, wherein the natural language recognition is based on a domain context of the requesting participant.

12. The method of claim 8, further comprising:
   receiving identities of all participants of the conversation; and
   identifying at least one common domain context among the all participants of the conversation, wherein the natural language recognition is based on the common domain context of the requesting participant.

13. The method of claim 8, wherein the at least one graph database comprises a tag graph comprising a tag node and an edge originating from the tag node to a document link node.

14. The method of claim 8, wherein the at least one graph database comprises a document link graph comprising a document link node, at least one edge from the document link node to at least one of the electronic files, and at least one edge from the document link node to an access control node.

15. A computer-readable storage device with a memory storing computer executable instructions which, when connected to and executed by at least one processor, perform a method for automatically assisting conversations among participants using graph database, the method comprising:
  receiving a phrase from a conversation between a first participant and a second participant;
  transcoding the phrase to at least one text phrase;
  extracting a tag from the at least one text phrase, wherein extracting the tag comprises:
    extracting at least one entity from the received phrase based on natural language recognition, wherein the natural language recognition is based on at least one of a first domain of the first participant or a second domain of the second participant; and
    based on the extracted at least one entity, retrieving the tag from at least one graph database;
  receiving a selection of the tag from at least one of the first participant or the second participant;
  retrieving a first set of links to a first subset of documents for the first participant from the at least one graph database based on: the tag, the first domain for the first participant, and access privileges for the first participant to the documents;
  retrieving a second set of links to a second subset of the documents for the second participant from the at least one graph database based on the tag, the second domain for the second participant, and access privileges for the second participant; and
  providing the first set of links to the first participant and the second set of links to the second participant.

16. The computer-readable storage device of claim 15, the method further comprising:
  receiving identity of the at least one of the first participant or the second participant.

17. The computer-readable storage device of claim 15, the method further comprising:
  receiving identity of at least one of the first participant or the second participant, and wherein retrieving the first set of links to the documents for the first participant and the second set of links to the documents for the second participant comprises:
    retrieving one or more tag nodes from the at least one graph database;
    based on the retrieved one or more tag nodes and the received identity, retrieving at least one link to documents associated with the one or more retrieved tag nodes; and
    ranking the retrieved at least one link to documents based on relevance to the extracted at least one entity.

18. The computer-readable storage device of claim 17, wherein the tag is associated with at least one document, and wherein the at least one document is accessible based on the received identity.

19. The computer-readable storage device of claim 17, wherein the at least one graph database comprises a tag graph, and wherein the tag graph comprises a tag node and an edge originating from the tag node to a document link node.

20. The computer-readable storage device of claim 17, wherein providing the first set of links to the first participant and the second set of links to the second participant comprises providing the first set of links to the first participant and the second set of links to the second participant based on access control information for the at least one of the first participant or the second participant.

* * * * *